(12) United States Patent
Ueki et al.

(10) Patent No.: US 10,882,223 B2
(45) Date of Patent: Jan. 5, 2021

(54) DAYLIGHTING DEVICE, MOLDING DIE, AND METHOD OF MANUFACTURING DAYLIGHTING FILM

(71) Applicant: SHARP KABUSHIKI KAISHA, Sakai (JP)

(72) Inventors: Tomoko Ueki, Sakai (JP); Yusuke Tsuda, Sakai (JP); Tsuyoshi Kamada, Sakai (JP); Hideomi Yui, Sakai (JP); Shun Ueki, Sakai (JP); Masahiro Tsujimoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 43 days.

(21) Appl. No.: 16/313,164

(22) PCT Filed: Jul. 4, 2017

(86) PCT No.: PCT/JP2017/024555
§ 371 (c)(1),
(2) Date: Dec. 26, 2018

(87) PCT Pub. No.: WO2018/008656
PCT Pub. Date: Jan. 11, 2018

(65) Prior Publication Data
US 2020/0180194 A1 Jun. 11, 2020

(30) Foreign Application Priority Data

Jul. 4, 2016 (JP) .................................. 2016-132695

(51) Int. Cl.
*B29C 39/24* (2006.01)
*B29C 39/02* (2006.01)
(Continued)

(52) U.S. Cl.
CPC ............ *B29C 39/24* (2013.01); *B29C 39/026* (2013.01); *B29C 39/26* (2013.01); *E04C 1/42* (2013.01);
(Continued)

(58) Field of Classification Search
CPC .... F21S 11/00; E04C 1/42; E04C 2/54; E04D 13/033; F21V 5/02
(Continued)

(56) References Cited

U.S. PATENT DOCUMENTS 9,863,593 B2 * 1/2018 Sakuragi .................... E06B 3/66
10,337,682 B2 * 7/2019 Tsujimoto ............ G02B 5/0242
(Continued)

FOREIGN PATENT DOCUMENTS

JP  2011-123478 A  6/2011
JP  2014-238513 A  12/2014
(Continued)

*Primary Examiner* — Clayton E. LaBalle
*Assistant Examiner* — Kevin C Butler
(74) *Attorney, Agent, or Firm* — ScienBiziP, P.C.

(57) ABSTRACT

A daylighting device according to an aspect of the invention includes at least a daylighting film that includes a base having optical transparency and daylighting portions having optical transparency and provided on one surface of the base. Each of the daylighting portions has a reflective surface by which light incident on the daylighting portion is reflected and the light reflected by the reflective surface and output from a second surface of the base has a characteristic that the light travels toward a space on a side where the light is incident on the reflective surface, the space being one of two spaces divided by a virtual plane as a boundary which is vertical to the second surface of the first substrate and parallel to a direction of the daylighting portion extending, and intervals s between adjacent daylighting portions are set to various values.

12 Claims, 37 Drawing Sheets

(51) Int. Cl.
*B29C 39/26* (2006.01)
*E06B 9/24* (2006.01)
*F21S 11/00* (2006.01)
*F21V 5/02* (2006.01)
*F21V 7/00* (2006.01)
*E04C 2/54* (2006.01)
*E04C 1/42* (2006.01)
*E04D 13/03* (2006.01)
*B29K 33/00* (2006.01)
*B29L 11/00* (2006.01)

(52) U.S. Cl.
CPC .............. *E04C 2/54* (2013.01); *E04D 13/033* (2013.01); *E06B 9/24* (2013.01); *F21S 11/007* (2013.01); *F21V 5/02* (2013.01); *F21V 7/0008* (2013.01); *B29K 2033/12* (2013.01); *B29L 2011/0083* (2013.01); *E06B 2009/2417* (2013.01)

(58) Field of Classification Search
USPC ........................................................ 359/595
See application file for complete search history.

(56) References Cited

U.S. PATENT DOCUMENTS

| | | | |
|---|---|---|---|
| 10,480,736 B2 * | 11/2019 | Nishinaka | F21V 11/04 |
| 10,513,091 B2 * | 12/2019 | Ueki | C03C 27/06 |
| 2008/0202703 A1 * | 8/2008 | Edmonds | E06B 9/386 |
| | | | 160/168.1 R |
| 2009/0009870 A1 * | 1/2009 | Usami | E06B 9/24 |
| | | | 359/592 |
| 2012/0120496 A1 * | 5/2012 | Thuot | E06B 7/082 |
| | | | 359/596 |
| 2016/0223154 A1 * | 8/2016 | Nango | E06B 5/00 |
| 2016/0252225 A1 | 9/2016 | Tsujimoto et al. | |
| 2017/0114590 A1 * | 4/2017 | Shinozaki | E06B 3/6715 |
| 2017/0146208 A1 * | 5/2017 | Ueki | B32B 7/05 |
| 2018/0231202 A1 * | 8/2018 | Ueki | B29C 41/38 |
| 2018/0231203 A1 * | 8/2018 | Ueki | F21S 11/00 |
| 2018/0356059 A1 * | 12/2018 | Ueki | E06B 5/00 |

FOREIGN PATENT DOCUMENTS

| | | | | |
|---|---|---|---|---|
| JP | 2014238513 | * | 12/2014 | ............ E06B 3/70 |
| JP | 2016-091941 A | | 5/2016 | |
| JP | 2016091941 | * | 5/2016 | ............ E06B 9/24 |
| WO | 2014/196596 A1 | | 12/2014 | |
| WO | 2015/056736 A1 | | 4/2015 | |
| WO | 2015/194499 A1 | | 12/2015 | |

* cited by examiner

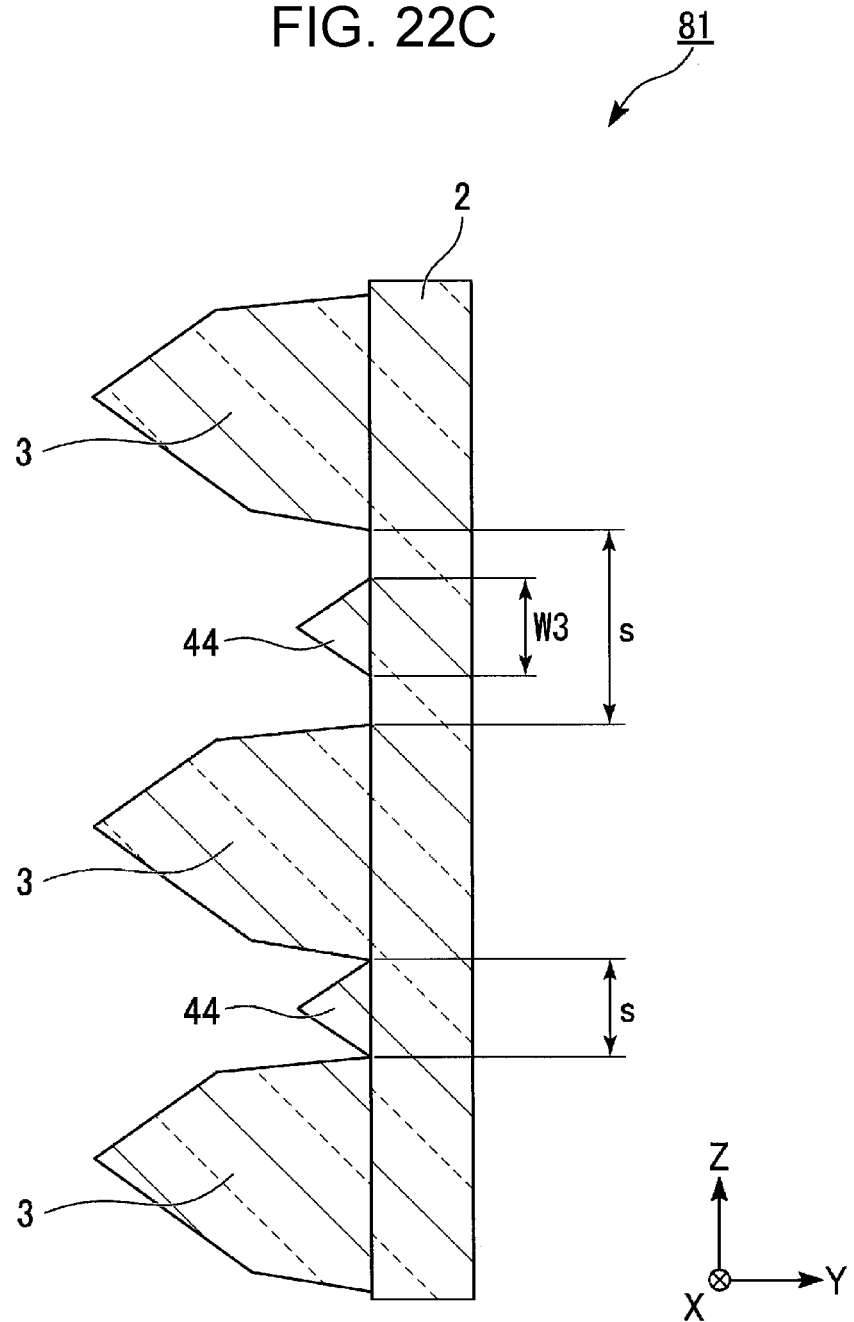

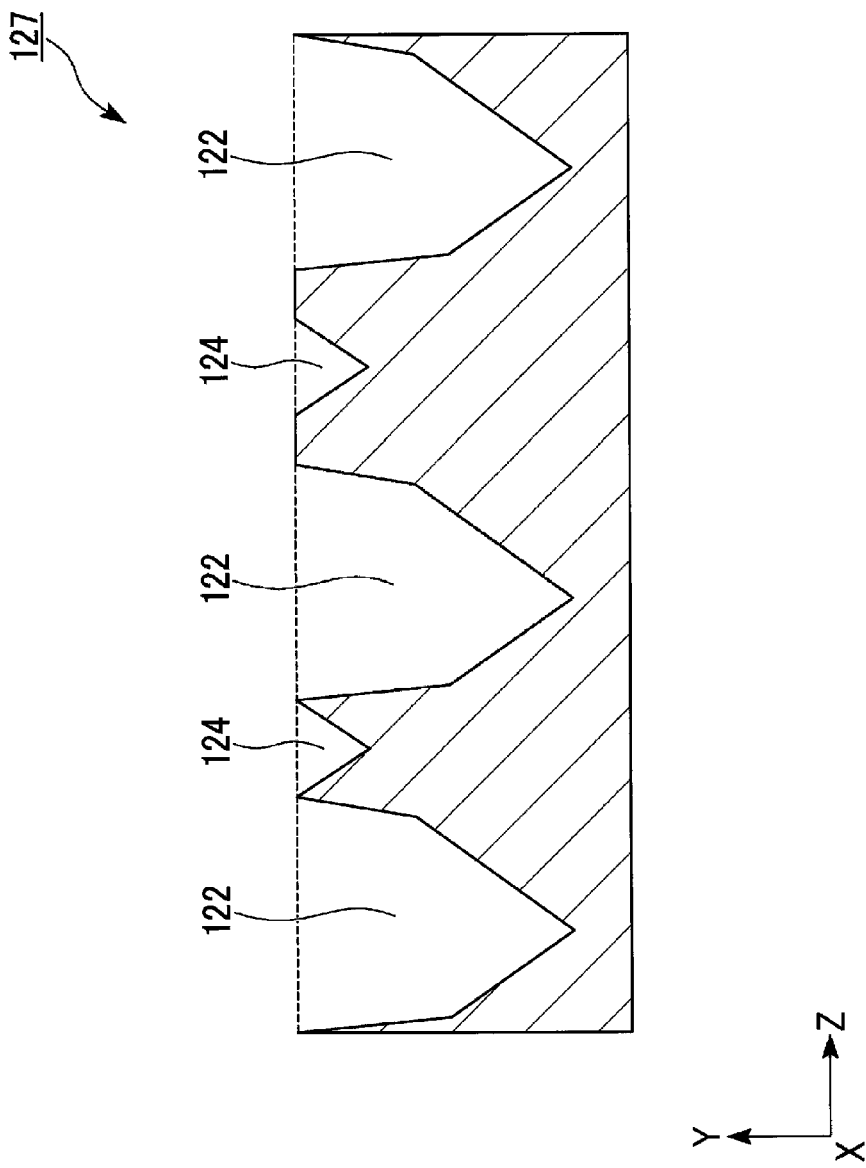

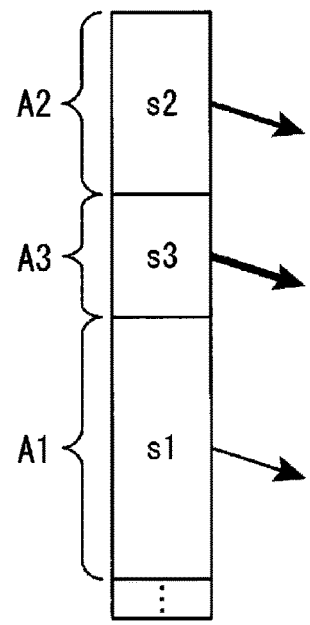

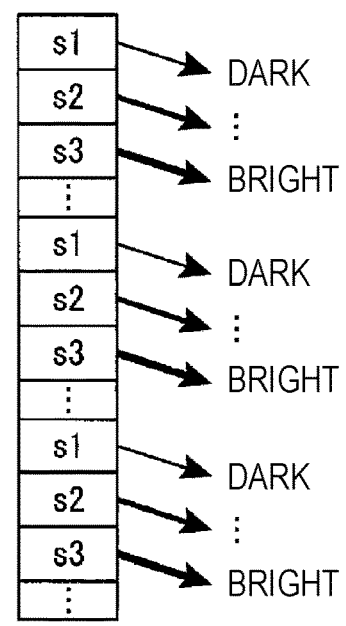

DAYLIGHTING DEVICE, MOLDING DIE, AND METHOD OF MANUFACTURING DAYLIGHTING FILM

TECHNICAL FIELD

An aspect of the present invention relates to a daylighting device, a molding die, and a method of manufacturing a daylighting film.

This application claims priority based on Japanese Patent Application No. 2016-132695 filed in Japan on Jul. 4, 2016, the content of which is incorporated herein.

BACKGROUND ART

As a technique for efficiently guiding light incident on a window glass into a room, for example, a technique described in PTL 1 has been known. According to the technique of PTL 1, a daylighting film in which unit prisms having a daylighting function are formed on one surface of a support having optical transparency is attached to an inner surface (indoor side surface) of the window glass. Light incident from the unit prism side is refracted by surfaces of the unit prisms, transmitted through the unit prisms, the support, and the window glass, and enters the room.

CITATION LIST

Patent Literature

PTL 1: Japanese Unexamined Patent Application Publication No. 2011-123478

SUMMARY OF INVENTION

Technical Problem

However, depending on a difference in the latitude and the orientation of a location where a window is disposed or depending on the altitude of the sun, a daylighting property of guiding light toward a ceiling may decrease, or light may be distributed to a line of sight of a person in a room, which dazzles the person to feel uncomfortable. In the following description, the light that dazzles the person in the room is referred to as glare.

An aspect of the invention is made in view of the aforementioned problems of the related art and an object thereof is to provide a daylighting device capable of ensuring a good indoor environment where glare is further suppressed and a person in a room is not dazzled, and a molding die.

Solution to Problem

A daylighting device according to an aspect of the invention includes at least a daylighting film that includes a base having optical transparency and a plurality of daylighting portions having optical transparency and provided on a first surface of the base. Each of the daylighting portions has a reflective surface by which light incident on the daylighting portion is reflected and the light reflected by the reflective surface and output from a second surface of the base has a characteristic that the light travels toward a space on a side where the light is incident on the reflective surface, the space being one of two spaces divided by a virtual plane as a boundary which is vertical to the second surface of the base and parallel to a direction of the daylighting portion extending, and intervals s between adjacent daylighting portions are set to a plurality of values.

The daylighting device according to the aspect of the invention may have a configuration in which at least one of the intervals s between the plurality of daylighting portions on the base is smaller than a width W1 of the daylighting portion in a direction intersecting the direction of the daylighting portions extending and satisfies a relation of s<W1.

The daylighting device according to the aspect of the invention may have a configuration in which at least a set of the intervals s between the plurality of daylighting portions on the base satisfies a following condition, $$\frac{s1-s2}{W1} \geq 0.015 \quad \text{[Math. 1]}$$

where s1 and s2 are two of the intervals with small values among the intervals s between the plurality of daylighting portions on the base, and s2 represents a minimum value and s1 represents a value larger than s2.

The daylighting device according to the aspect of the invention may have a configuration in which a small structure that has optical transparency or light absorbability exists between the plurality of daylighting portions.

The daylighting device according to the aspect of the invention may have a configuration in which the small structure is made of a material identical to a material of the daylighting portions or the base.

The daylighting device according to the aspect of the invention may have a configuration in which each of the daylighting portions has at least one pair of inclined surfaces that are inclined in directions different from each other relative to one surface of the base and that face each other in a direction of the daylighting portions being arranged, and a shape of the small structure is similar to a shape of a part of the daylighting portion, the part having the at least one pair of inclined surfaces.

The daylighting device according to the aspect of the invention may have a configuration in which the base is integrated with a member that changes an optical path.

The daylighting device according to the aspect of the invention may have a configuration in which a refractive index of the base has distribution in a surface.

The daylighting device according to the aspect of the invention may have a configuration in which a refractive index of the plurality of daylighting portions has distribution in one surface of the base.

A molding die according to an aspect of the invention is a molding die for a daylighting film. The daylighting film includes a base having optical transparency and a plurality of daylighting portions having optical transparency and provided on a first surface of the base, in which each of the daylighting portions has a reflective surface by which light incident on the daylighting portion is reflected and the light reflected by the reflective surface and output from a second surface of the base has a characteristic that the light travels toward a space on a side where the light is incident on the reflective surface, the space being one of two spaces divided by a virtual plane as a boundary which is vertical to the second surface of the base and parallel to a direction of the daylighting portion extending, and intervals s between adjacent daylighting portions are set to a plurality of values. The molding die includes: a main portion made of metal; and a plurality of first recessed portions provided on a surface of one side of the main portion and corresponding to the plurality of daylighting portions. Intervals u between adjacent first recessed portions are set to a plurality of values corresponding to the plurality of values of the intervals s.

The molding die according to the aspect of the invention may have a configuration in which at least one of the intervals u between the plurality of first recessed portions in the main portion is smaller than a width W2 of the first recessed portion in a direction intersecting a direction of the first recessed portions extending and satisfies a relation of u<W2.

The molding die according to the aspect of the invention may have a configuration in which at least a set of the intervals u between the plurality of first recessed portions in the main portion satisfies a following condition, $$\frac{u1-u2}{W2} \geq 0.015 \qquad [\text{Math. 2}]$$

where u1 and u2 are two of the intervals with small values among the intervals u between the plurality of first recessed portions in the main portion, and u2 represents a minimum value and u1 represents a value larger than u2.

The molding die according to the aspect of the invention may have a configuration in which a second recessed portion corresponding to a small structure exists between the plurality of first recessed portions.

In the molding die according to the aspect of the invention, a manufacturing method may include: applying resin having optical transparency to one surface of the main portion and filling the first recessed portions with the resin; curing the resin to form a daylighting film having a daylighting portion made of the resin; and separating the daylighting film from the molding die.

In the molding die according to the aspect of the invention, in the filling the first recessed portions with the resin, the resin having optical transparency may be applied to the first recessed portions and the second recessed portion.

Advantageous Effects of Invention

An aspect of the invention is made in view of the aforementioned problems of the related art and it is possible to provide a daylighting device capable of ensuring a good indoor environment where glare is further suppressed and a person in a room is not dazzled, a molding die for molding the daylighting device, a method of manufacturing a daylighting film using the molding die.

BRIEF DESCRIPTION OF DRAWINGS

FIG. 22C illustrates a configuration in which, in an interval between adjacent daylighting portions, a small structure having a width narrower than the interval is provided.

FIG. 22D illustrates a configuration in which, in an interval between adjacent first recessed portions, a small structure having a width narrower than the interval is provided.

DESCRIPTION OF EMBODIMENTS

First Embodiment

A daylighting device of a first embodiment will be described with reference to the following drawings.

Figure 1:
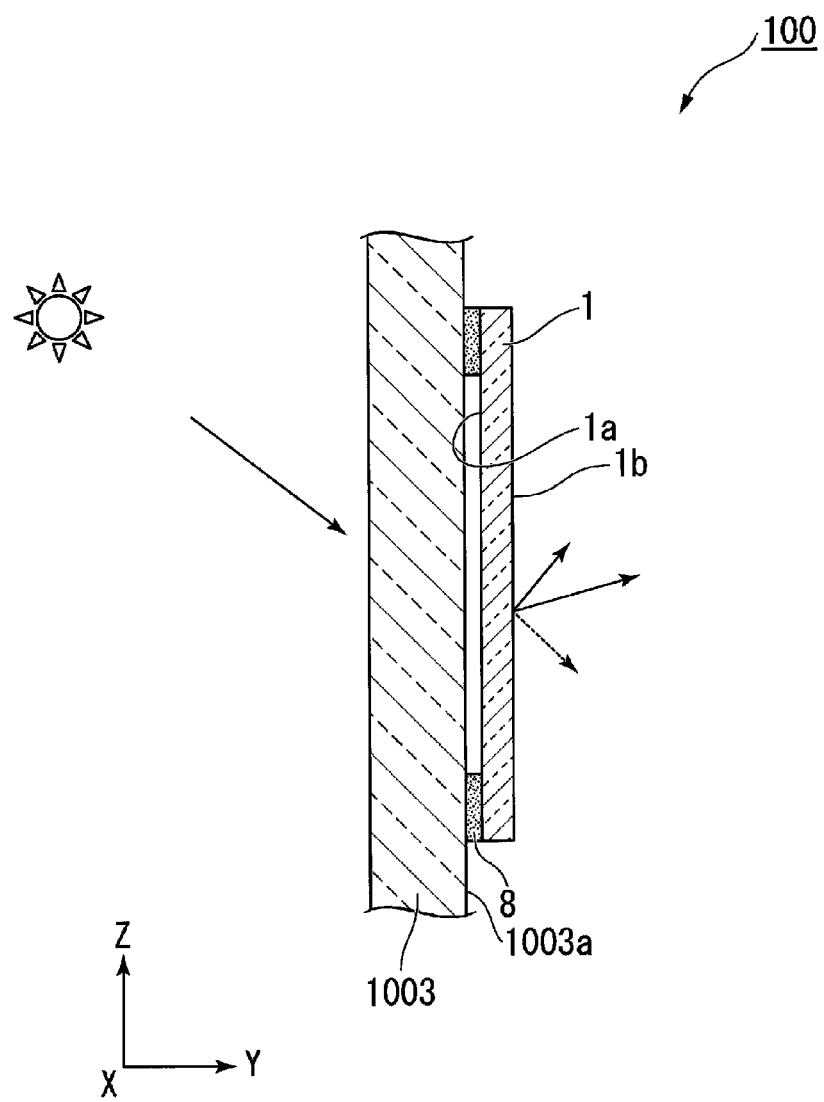
FIG. 1 is a sectional view illustrating a schematic configuration of a daylighting device that is a first embodiment of the invention.
Figure 2:
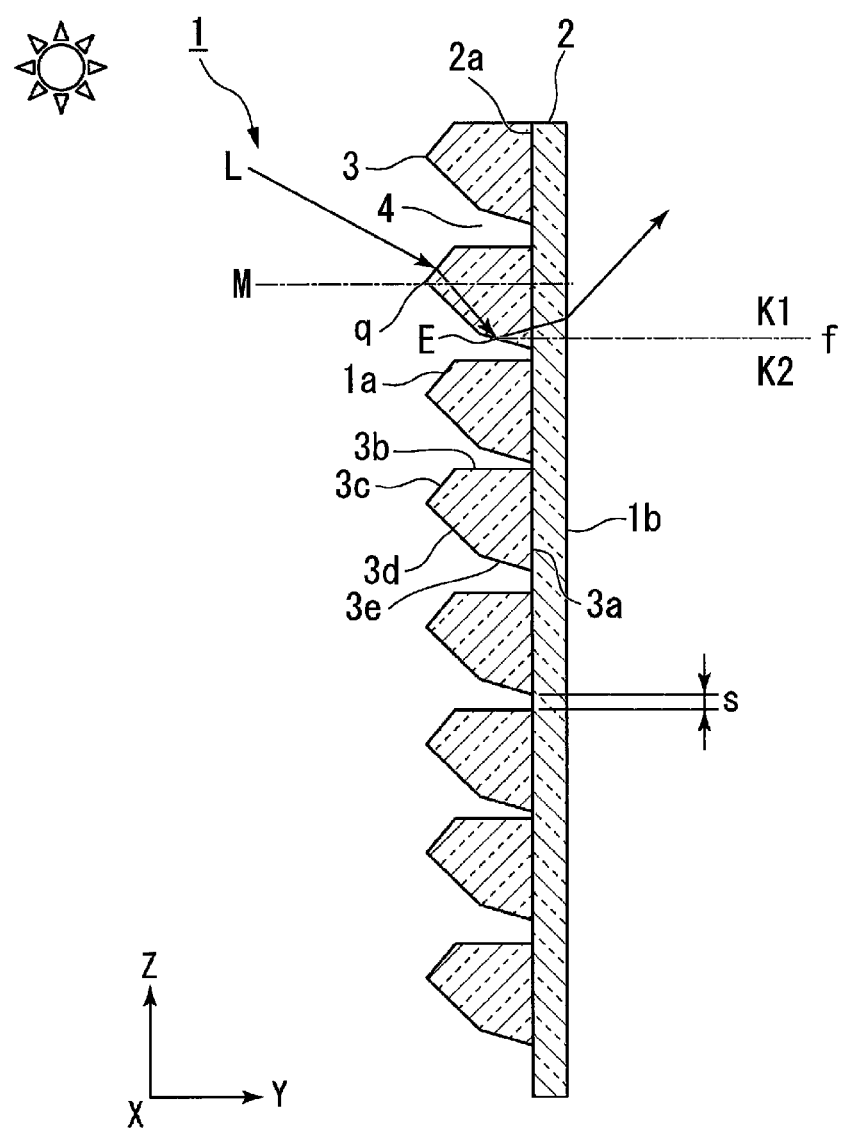
FIG. 2 is an enlarged sectional view illustrating a main part of the daylighting device in the first embodiment.
Figure 3:
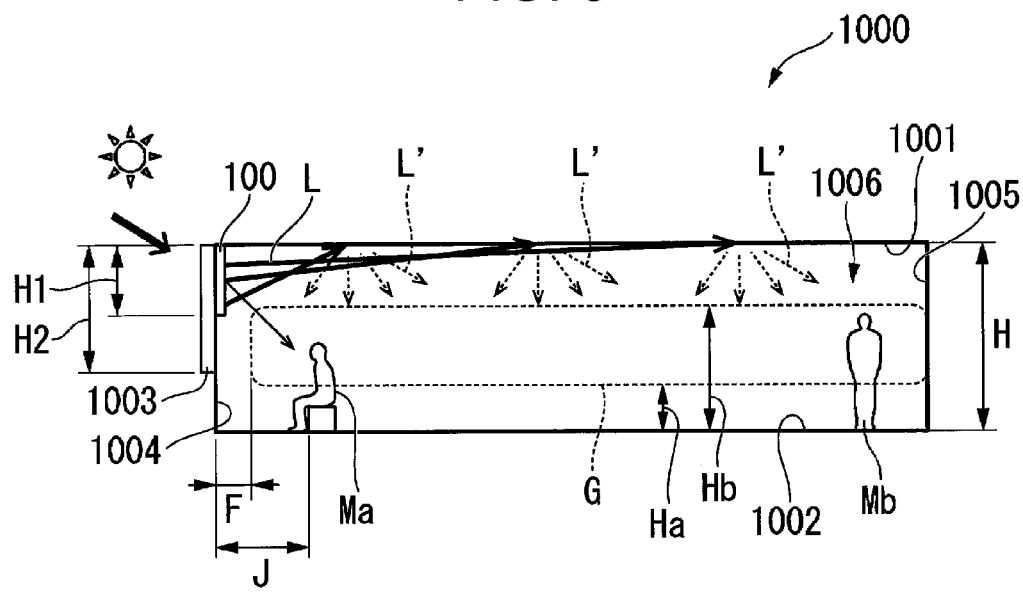
FIG. 3 is a schematic view illustrating an example of a room model.
Figure 4:
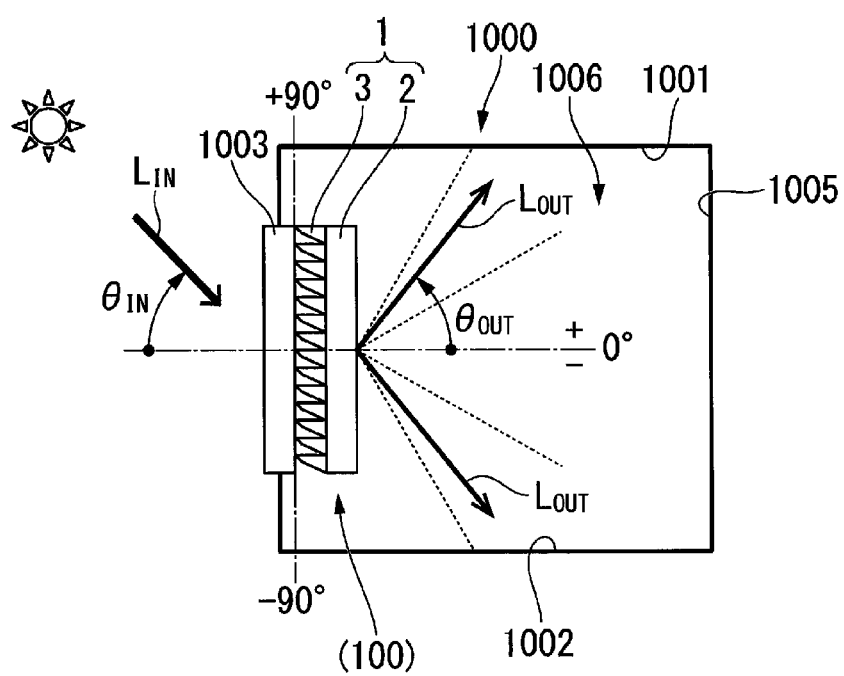
FIG. 4 is a view for explaining definitions of an incoming angle θ, of incoming light $L_{IN}$ incident on the daylighting device and an outgoing angle $\theta_{OUT}$ of outgoing light $L_{OUT}$ output from the daylighting device.

FIG. 1 is a sectional view illustrating a schematic configuration of the daylighting device that is the first embodiment of the invention. FIG. 2 is an enlarged sectional view illustrating a main part of the daylighting device in the first embodiment. FIG. 3 is a schematic view illustrating an example of a room model. FIG. 4 is a view for explaining definitions of an incoming angle $\theta_{IN}$ of incoming light $L_{IN}$ incident on the daylighting device and an outgoing angle $\theta_{OUT}$ of outgoing light $L_{OUT}$ output from the daylighting device.

A daylighting device 100 of the first embodiment is an example of a daylighting device that guides sunlight into a room in a state where the daylighting device 100 is attached to a window glass, for example.

As illustrated in FIG. 1, the daylighting device 100 includes a daylighting film 1 and is provided on an inner surface 1003a (indoor side surface) of a window glass (to which the daylighting device 100 is attached) 1003, for example, through an adhesive layer 8 or on the surface of 1003a.

Here, a top-bottom direction of a paper surface and a top-bottom direction (XZ direction) of the daylighting film 1 attached to the window glass 1003 coincide with each other.

As illustrated in FIG. 2, the daylighting film 1 includes a first base 2 having optical transparency, and daylighting portions 3 which are provided on a first surface 2a of the first base 2 and have optical transparency.

Gaps 4 are formed between the daylighting portions 3.

In the present embodiment, a microstructure side where the daylighting portions 3 are formed is a light incoming surface 1a of the daylighting film 1 and a side where the microstructure is not formed is a light outgoing surface 1b. The daylighting film 1 is used in a posture where the light incoming surface 1a side faces the window glass 1003 illustrated in FIG. 1.

The daylighting portions 3 are arranged with a predetermined interval in a Z direction on the first surface 2a of the first base 2. In the present embodiment, an interval s between adjacent daylighting portions 3 is set to various values.

As the first base 2, for example, a base having optical transparency and formed of a resin such as thermoplastic polymer, thermosetting resin, photopolymerizable resin, or the like is used. The base having optical transparency and formed of acrylic polymer, olefinic polymer, vinyl-based polymer, cellulosic polymer, amide-based polymer, fluorinated polymer, urethane-based polymer, silicone-based polymer, imide-based polymer, or the like is used. Specifically, for example, the base having optical transparency such as a triacetyl cellulose (TAC) film, a polyethylene terephthalate (PET) film, a cycloolefin polymer (COP) film, a polycarbonate (PC) film, a polyethylene naphthalate (PEN) film, a polyethersulfone (PES) Film, or a polyimide (PI) film is preferably used.

In the present embodiment, a PET film having a thickness of 100 μm is used, for example. A total luminous transmittance of the first base 2 is preferably equal to or more than 90% in accordance with JIS K7361-1. Thereby, it is possible to obtain sufficient transparency.

The first base 2 may have any thickness and may have a film shape or a plate shape. The first base 2 may have a laminated structure in which two or more bases are laminated each other.

Each of the daylighting portions 3 is formed of an organic material having optical transparency and a slow acting property, such as acrylic resin, epoxy resin, or silicone resin, for example. A transparent resin mixture obtained by mixing, into such resin, a polymerization initiator, a coupling agent, a monomer, an organic solvent, etc. is able to be used. Further, the polymerization initiator may contain various additional components, such as a stabilizer, an inhibitor, a plasticizer, a fluorescent brightener, a release agent, a chain transfer agent, and other photopolymerizable monomers.

In the present embodiment, the daylighting portions 3 are formed on the first base 2 by using a thermal imprinting method. The method of forming the daylighting portions 3 is not limited to the thermal imprinting method, and a UV imprinting method, a hot pressing method, an injection molding method, an extrusion molding method, a compressive molding method, or the like may be used, for example. The first base 2 and the daylighting portions 3 are integrally formed with the same resin by a method such as a melt extruding method or a mold extruding method.

In the present embodiment, polymethylmethacrylate (PMMA) is used as an example of the daylighting portions 3. A total luminous transmittance of the daylighting portions 3 is preferably equal to or more than 90% in accordance with JIS K7361-1. Thereby, it is possible to obtain sufficient transparency.

As illustrated in FIG. 2, each of the daylighting portions 3 linearly extends to be long and narrow in a direction (a direction perpendicular to a paper surface of FIG. 2) and forms a polygonal column shape in section orthogonal to a longitudinal direction. The daylighting portion 3 is a pentagon having five vertexes in section cut in a direction intersecting the longitudinal direction thereof and all inner angles are less than 180°. The daylighting portions 3 have the longitudinal direction parallel to one side of the first base 2 having a rectangular shape, and are arrayed in a width direction thereof.

Specifically, each of the daylighting portions 3 has a polygonal columnar structure having pentagonal cross section in which shapes on both sides are asymmetrical with respect to a line M passing through a vertex q farthest from a surface 3*a* facing the first surface 2*a* of the first base 2 and perpendicular to the surface 3*a*. That is, the daylighting portion 3 has a shape in which a volume of a lower part including a surface (reflective surface) 3*d* and a surface (reflective surface) 3*e* is larger than a volume of an upper part including a surface 3*b* and a surface 3*c*. In the present embodiment, the daylighting portions 3 are arranged uniformly in a state where a large volume side (the surface 3*d* and surface 3*e* side) is positioned at the lower side around the line M perpendicular to the surface 3*a* in each of the daylighting portions 3.

Note that, the sectional shape of the daylighting portion 3 is not limited to a pentagon and may be a polygonal shape with three or more sides. Also, the sectional shape may be a shape other than a polygonal shape or may be a polyhedral shape. That is, the daylighting portion 3 is sufficient if shapes of both sides are asymmetrical with respect to any line perpendicular to the surface 3*a*. The daylighting film 1 is sufficient if a prism structure having a sectional shape in which the volume of the lower part is equal to or more than the volume of the upper part is continuously formed.

A typical optical adhesive is used as the adhesive layer 8. A refractive index of the adhesive layer 8 is preferably equal to a refractive index of the window glass 1003. Thereby, refraction does not occur at an interface between the daylighting film 1 and the window glass 1003.

The daylighting film 1 having such a configuration is attached to the inner surface 1003*a* of the window glass 1003 through the adhesive layer 8 in such a manner that the longitudinal direction of each of the daylighting portions 3 is directed to a horizontal direction and a direction of the daylighting portions 3 being arranged is directed to a vertical direction.

Light directly received from the sun is first incident on the window glass 1003, passes through the window glass 1003, and then is incident obliquely downward on the daylighting device 100. Light L incident on the daylighting device 100 is refracted by the surface 3*c* or the surface 3*b* of each of the daylighting portions 3 in the daylighting film 1 illustrated in FIG. 2, and then totally reflected by the surface 3*d* or the surface 3*e* to proceed obliquely upward, and is output from a second surface 2*b* (an interface between the second surface 2*b* and an indoor space) of the first base 2 toward a ceiling.

Here, for convenience of description, a point where any one light flux of the light incident on the daylighting portion 3 illustrated in FIG. 2 is incident on the surface 3*e* (reflective surface) of the daylighting portions 3 is set as an incoming point E. An imaginary straight line passing through the incoming point E and orthogonal to the first surface 2*a* of the first base 2 is set as a straight line f. Out of two spaces having a horizontal plane (virtual plane) including the straight line f as a boundary, a space on a side where the light L incident on the incoming point E exists is set as a first space K1 and a space on a side where the light L incident on the incoming point E does not exist is set as a second space K2.

For example, the light L incident from the surface 3*c* of the daylighting portion 3 is totally reflected by the surface 3*e* of the daylighting portion 3 to proceed obliquely upward, that is, toward the first space K1 side, and is output from the surface 3*a* of the daylighting portion 3. The light L output from the daylighting portion 3 passes through the first base 2 and travels from the daylighting film 1 toward the indoor ceiling. Since the light output from the daylighting film 1 toward the ceiling is reflected by the ceiling and illuminates the inside of the room, the light is used instead of illumination light. Accordingly, when such a daylighting film 1 is used, it is possible to expect an energy saving effect of saving the energy consumed by lighting equipment in a building during the daytime.

(Room Model)

Here, daylighting characteristics of the daylighting device 100 will be described by using a room model 1000 illustrated in FIG. 3. The room model 1000 is, for example, a model assuming that the daylighting device 100 is used in an office. Specifically, the room model 1000 illustrated in FIG. 3 simulates a case where outdoor light L enters a room 1006 through the window glass 1003 from obliquely above. The room 1006 is surrounded by a ceiling 1001, a floor 1002, a front side wall 1004 to which the window glass 1003 is attached, and a back side wall 1005 facing the front side wall 1004. The daylighting device 100 is attached to an upper portion side of an inner surface of the window glass 1003.

In the room model 1000, a height dimension (a dimension from the ceiling 1001 to the floor 1002) H of the room 1006 is set to 2.7 m, a top-bottom dimension H2 of the window glass 1003 is set to 1.8 m from the ceiling 1001, and a top-bottom dimension H1 of the daylighting film 1 is set to 0.6 m from the ceiling 1001.

In the room model 1000, there are a person Ma sitting on a chair in the room 1006 and a person Mb standing on the floor 1002 in the deep inside of the room 1006. A lower limit Ha of height of eyes of the person Ma sitting on the chair is set to 0.8 m from the floor 1002, and an upper limit Hb of height of eyes of the person Mb standing on the floor 1002 is set to 1.8 m from the floor 1002.

A region (hereinafter, referred to as a glare region) G where the persons Ma and Mb in the room 1006 are dazzled is a range between the heights Ha and Hb of the eyes of the persons Ma and Mb in the room. In addition, a vicinity of the window glass 1003 in the room 1006 is a region F in which the outdoor light L is directly radiated mainly through a lower portion side of the window glass 1003 to which the daylighting film 1 is not attached. The region F is set to be in a range of 1 m from the front side wall 1004. Accordingly, the glare region G is in a range from a position 1 m apart from the front side wall 1004 excluding the region F to the back side wall 1005 in a range of height from 0.8 m to 1.8 m from the floor 1002.

For example, out of the light output from the daylighting device 100, light in a range of the outgoing angle of −45° to 0° may be glare light.

The glare region G is a region defined on the basis of a position of eyes in a region where a person moves. Even in a case where the room 1006 is brightly illuminated by the light travelling toward the ceiling 1001, when a quantity of the light reaching the glare region G is large, the person in the room 1006 tends to feel uncomfortable.

The daylighting film 1 of the present embodiment is capable of relatively increasing luminance of the light directed to the ceiling 1001 while reducing luminance of the light directed to the glare region G out of the light L entering the room 1006 through the window glass 1003. Light L' reflected by the ceiling 1001 brightly illuminates the room 1006 over a wide range instead of illumination light. In this case, by turning off lighting equipment in the room 1006, it is possible to expect an energy saving effect of saving the energy consumed by the lighting equipment in the room 1006 during the daytime.

Definitions of Incoming Angle and Outgoing Angle

Next, definitions of an incoming angle $\theta_{IN}$ of incoming light $L_{IN}$ incident on the daylighting device 100 and an outgoing angle $\theta_{OUT}$ of outgoing light $L_{OUT}$ output from the daylighting device 100 will be described with reference to FIG. 4.

Note that, in FIG. 4, the daylighting film 1 in the daylighting device 100 is mainly illustrated and the other components are not illustrated.

As illustrated in FIG. 4, with respect to the incoming angle $\theta_{IN}$ of the incoming light $L_{IN}$ and the outgoing angle $\theta_{OUT}$ of the outgoing light Lour, an angle in a direction along a line normal to the daylighting device 100 (the first base 2 of the daylighting film 1) is defined as 0°, an angle in a direction directed to the ceiling 1001 is defined as positive (+), and an angle in a direction directed to the floor 1002 is defined as negative (−).

When the outgoing angle $\theta_{OUT}$ of the outgoing light $L_{OUT}$ output from the daylighting device 100 is more than 00, the light is directed to the ceiling, and when the outgoing angle $\theta_{OUT}$ is 00 or less, the light is directed to the side wall 1005 facing the window glass 1003 and may be glare light.

In the daylighting device 100 of the present embodiment, when the incoming angle $\theta_{IN}$ of the incoming light $L_{IN}$ incident on each of the daylighting portions 3 of the daylighting film 1 is at least in a range of $20° \leq \theta_{IN} \leq 50°$ with respect to a line normal to the daylighting film 1, the outgoing angle $\theta_{OUT}$ of the outgoing light $L_{OUT}$ output from the daylighting film 1 is in a range of $0° \leq \theta_{OUT} \leq 15°$ on the same side (+ side) as that of the incoming light $L_{IN}$ with respect to the line normal to the daylighting film 1 and the luminance of the outgoing light Lour is set to be relatively high.

Thereby, it is possible to relatively increase luminance of the light directed to the ceiling 1001 while decreasing luminance of the light directed to the glare region G or the light directed to the floor 1002, out of the light L entering the room 1006 through the daylighting device 100 and the window glass 1003. That is, the light L entering the room 1006 through the daylighting device 100 and the window glass 1003 is able to be efficiently radiated to the ceiling 1001. In addition, it is possible to radiate the light L directed to the ceiling 1001 to the deep inside of the room 1006 without dazzling the person Ma or Mb in the room 1006.

Furthermore, the light L' reflected by the ceiling 1001 illuminates the room 1006 brightly over a wide range instead of illumination light. In this case, by turning off the lighting equipment in the room 1006, it is possible to expect an energy saving effect of saving the energy consumed by the lighting equipment in the room 1006 during the daytime.

In addition, as illustrated in FIG. 4, in the daylighting device 100 of the present embodiment, when a variation range of the incoming angle $\theta_{IN}$ of the incoming light $L_{IN}$ is set as $\Delta\theta_{IN}$ and a variation range of the outgoing angle $\theta_{OUT}$ of the outgoing light $L_{OUT}$ is set as $\Delta\theta_{OUT}$, it is preferable that a relation of $\Delta\theta_{IN} > \Delta\theta_{OUT}$ is satisfied in a range of $20° \leq \theta_{IN} \leq 50°$.

In this case, a variation in an irradiation position in the room 1006 due to a change in the altitude of the sun is able to be suppressed. In addition, the light L directed to the ceiling 1001 is able to be radiated to the deep inside of the room 1006 for a long time. Thereby, it is possible to expect a further energy saving effect.

Figure 5A:
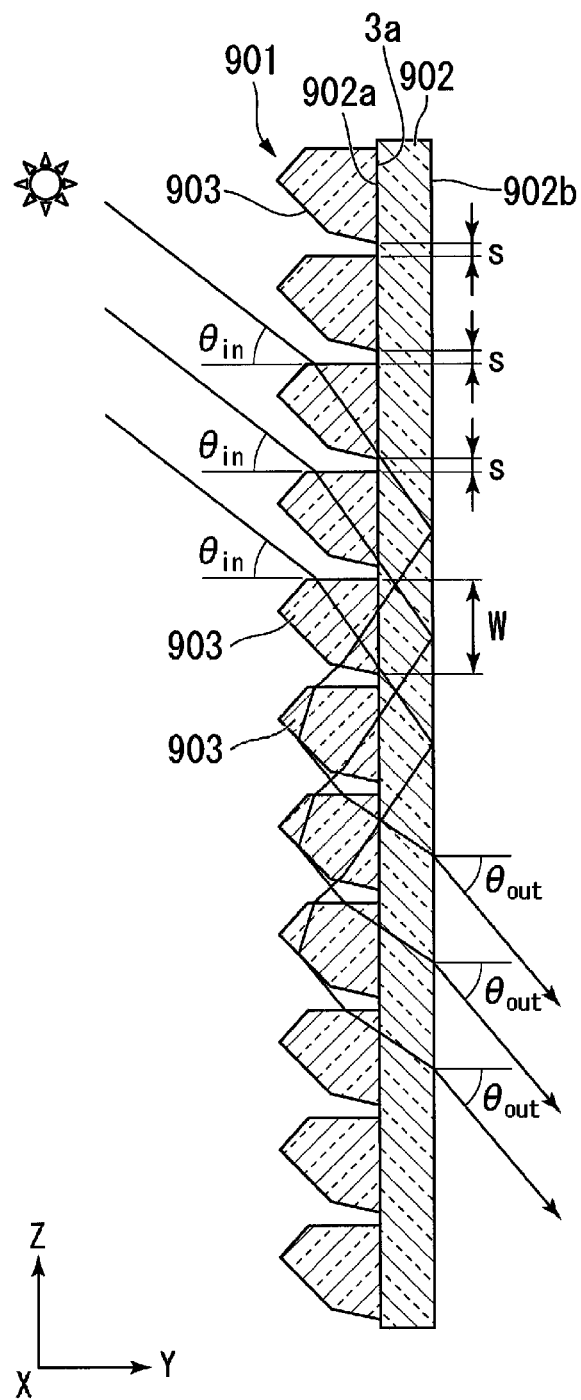
FIG. 5A illustrates a configuration of a daylighting film as a comparative example and an optical path of light transmitted through the daylighting film (a microstructure is on an outdoor side).
Figure 5B:
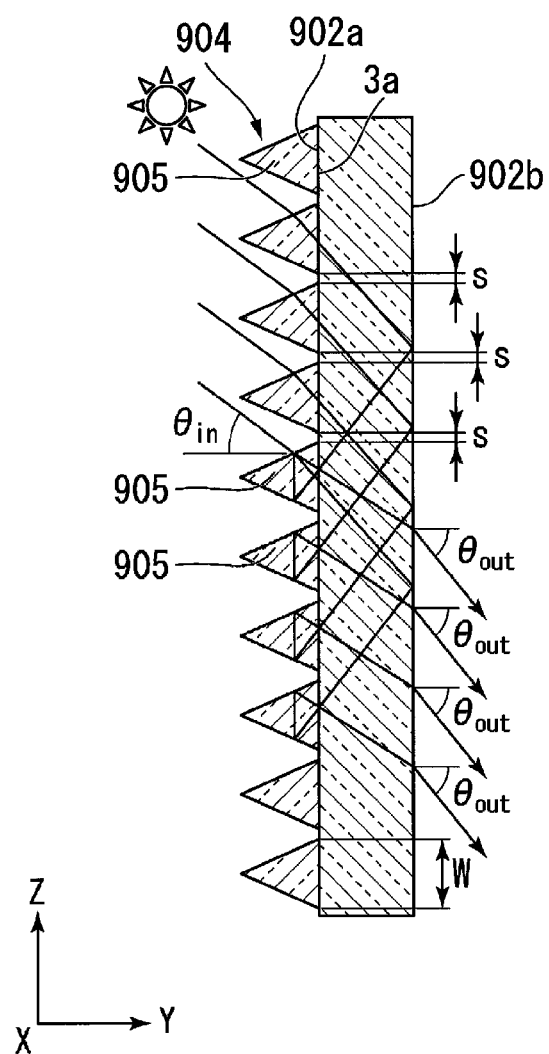
FIG. 5B illustrates a configuration of a daylighting film as a comparative example and an optical path of light transmitted through the daylighting film (the microstructure is on the outdoor side).

Here, a configuration of a daylighting film 901 and an optical path of light transmitted through the daylighting film 901 will be described as a comparative example. FIG. 5A illustrates as the comparative example the configuration of the daylighting film 901 and the optical path of the light transmitted through the daylighting film 901. FIG. 5B illustrates as another comparative example a configuration of a daylighting film 904 and an optical path of light transmitted through the daylighting film 904.

As illustrated in FIG. 5A or 5B, in the conventional daylighting film 901 or 904, daylighting portions 903 or 905 adjacent in the Z direction are arranged with a constant interval s (s>0).

The daylighting film 901 illustrated in FIG. 5A includes daylighting portions 903 whose sectional shape is a pentagon, and a contact length (z direction) W between a surface 3a of one daylighting portion 903 and a first surface 902a of a first base 902 is about 150 μm and the interval s between the daylighting portions 903 is 20 μm.

The daylighting film 904 illustrated in FIG. 5B includes daylighting portions 905 whose sectional shape is a triangle, and a contact length (z direction) W between a surface 3a of one daylighting portion 905 and the first surface 902a of the first base 902 is about 150 μm and the interval s between the daylighting portions 905 is 20 μm.

Note that, the sectional shape of the daylighting portions 903 or 905 is not limited to the shape illustrated.

Figure 5C:
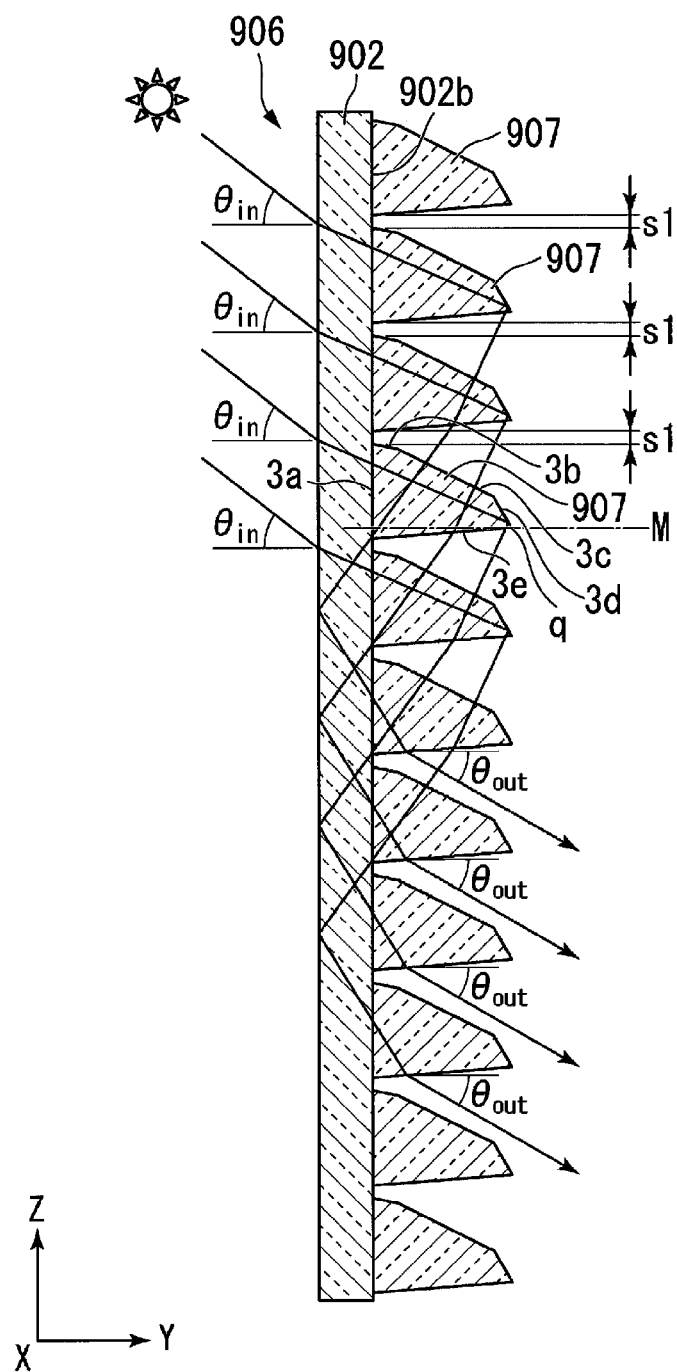
FIG. 5C illustrates a configuration of a daylighting film as a comparative example and an optical path of light transmitted through the daylighting film (the microstructure is on an indoor side).

For example, like a daylighting portion 907 of a daylighting film 906 illustrated in FIG. 5C, a polygonal columnar structure in which shapes on both sides are asymmetrical with respect to a line M passing through a vertex q farthest from the surface 3a facing the second surface 902b of the first base 902 and perpendicular to the surface 3a and a sectional shape is a pentagon may be provided. That is, a shape in which a volume of a lower part including the surface 3e (reflective surface) is smaller than a volume of an upper part including the surface 3b, the surface 3c, and the surface 3d may be provided.

Light incident on the daylighting portions 903 or 905 of the daylighting film 901 or 904 illustrated in FIG. 5A or 5B is reflected by an interface between the second surface 902b of the first base 902 and an air layer, and then refracted by the daylighting portions 903 or 905 positioned below the daylighting portions 903 or 905 on which the light is incident, and output to the room at a certain outgoing angle $\theta_{OUT}$. In a case where there are many such rays of light "stray light glare", when the respective rays of light are output to the room at the same outgoing angle $\theta_{OUT}$, a person in the room may be dazzled.

In a structure where the daylighting portions 903 or 905 are arranged regularly, the light incident on the daylighting film 901 or 904 follows the same optical path due to repetitive arrangement of the respective daylighting portions 903 or 905. Therefore, the rays of light that become stray light glare concentrate at the same outgoing angle $\theta_{OUT}$ and causes the person in the room to feel uncomfortable.

Figure 5D:
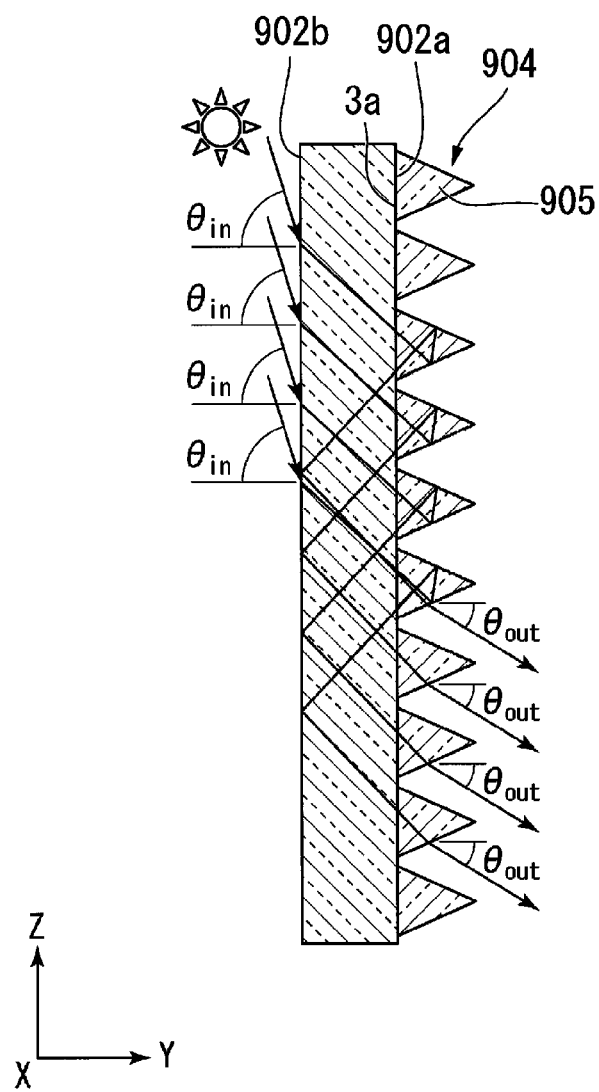
FIG. 5D illustrates a configuration of a daylighting film as a comparative example and an optical path of light transmitted through the daylighting film (the microstructure is on the indoor side).

In addition, for example, as illustrated in FIG. 5C or 5D, also in a case of installation in which a microstructure surface formed with the daylighting portions 907 or 905 is directed to the indoor side, stray light glare is generated similarly.

Figure 6:
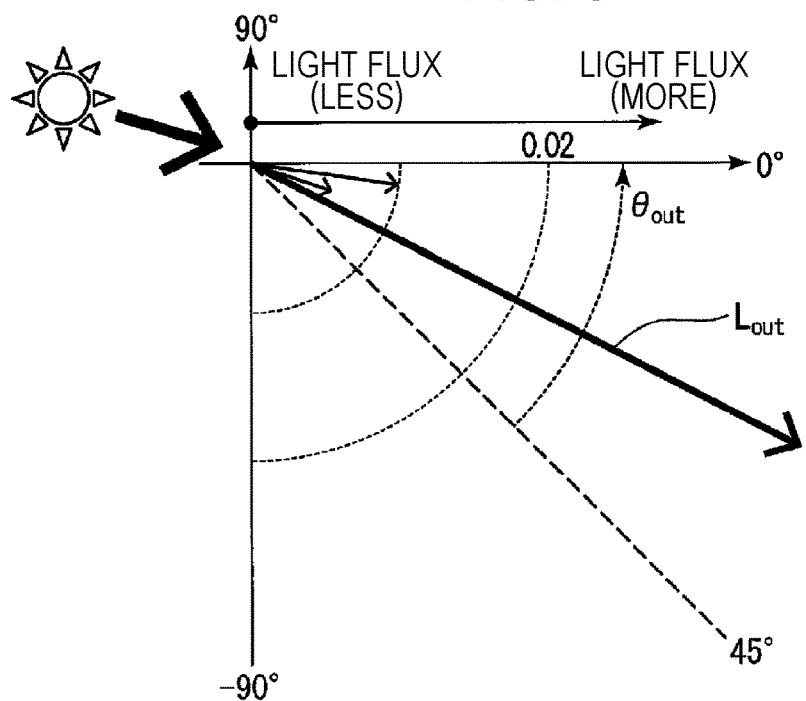
FIG. 6 is a view for explaining characteristics of the daylighting film illustrated in FIG. 5A as the comparative example.
Figure 7:
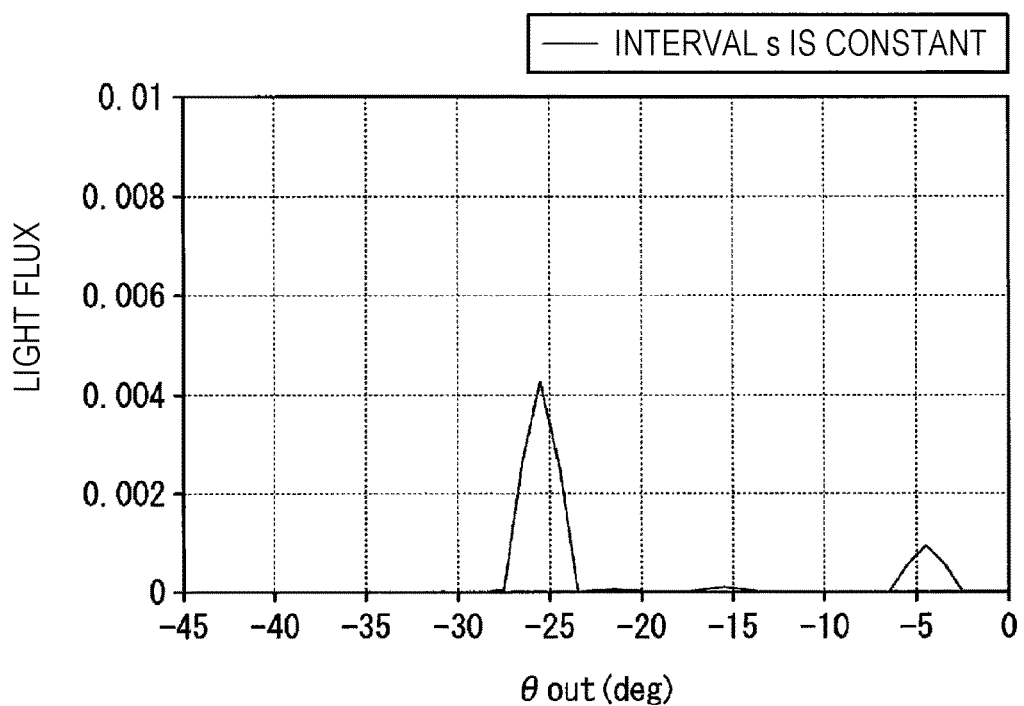
FIG. 7 illustrates a relationship between an outgoing angle and a light flux of stray light glare.

FIG. 6 is a view for explaining characteristics of the daylighting film 901 illustrated in FIG. 5A as the comparative example. FIG. 7 illustrates a relationship between an outgoing angle and a light flux of stray light glare. FIG. 7 indicates a result when the interval s between the daylighting portions 903 is 10 μm.

As illustrated in FIG. 6, in the outgoing light $L_{OUT}$ output from the daylighting film 901, there are many glare light fluxes formed in a range where the outgoing angle $\theta_{OUT}$ is $0° \leq \theta_{OUT} \leq -45°$ by rays of light exceeding a lower limit level at which a person is dazzled. In the conventional daylighting film 901, as illustrated in FIGS. 6 and 7, it is found that the outgoing angles $\theta_{OUT}$ of stray light glare $L_{OUT}$ concentrate at near $-26°$.

Figure 8:
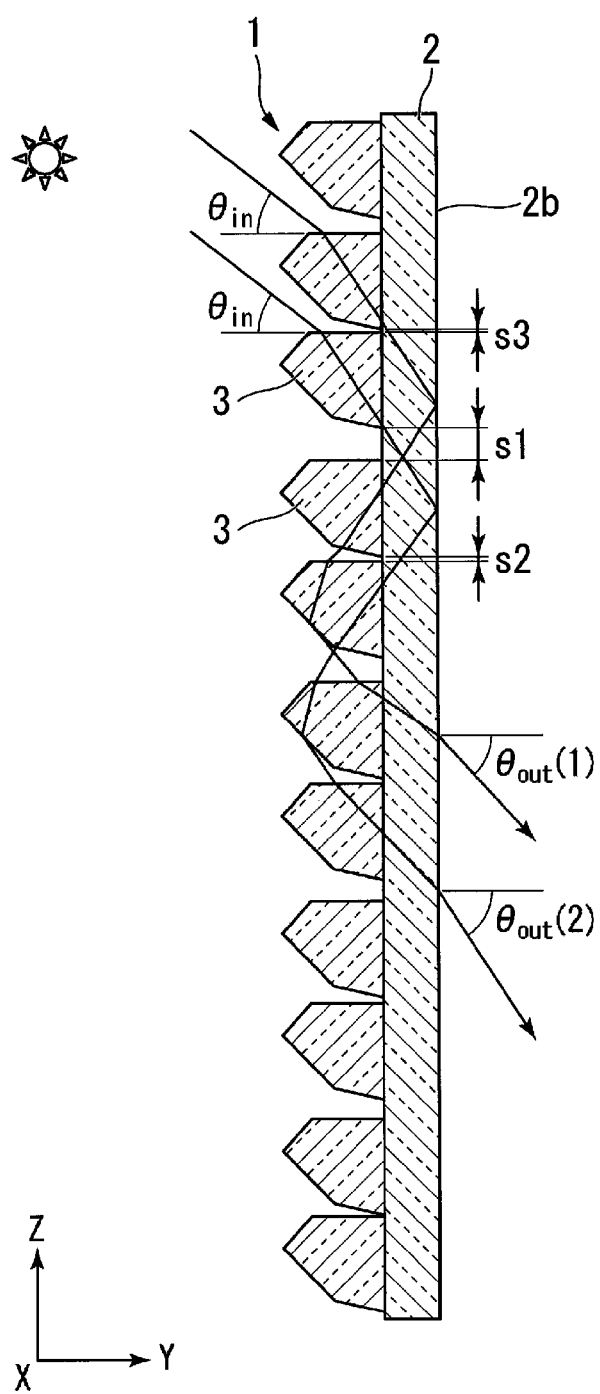
FIG. 8 illustrates a configuration of the daylighting film of the embodiment and an optical path of light transmitted through the daylighting film.

FIG. 8 illustrates a configuration of the daylighting film 1 of the present embodiment and an optical path of light transmitted through the daylighting film 1.

As illustrated in FIG. 8, in the daylighting film 1 of the present embodiment, the interval s between the daylighting portions 3 adjacent in the Z direction is not constant and is set to various values. Specifically, three different intervals s1, s2, and s3 (interval s1>interval s2>interval s3) are set here. In the present embodiment, the interval s1 is set to be, for example, 15 μm, the interval s2 is set to be, for example, 10 μm, and the interval s3 is set to be, for example, 5 μm.

On the daylighting film 1, the daylighting portions 3 may be arranged so that the three intervals s1 to s3 repeatedly exist in given order in the Z direction or the daylighting portions 3 may be arranged so that the intervals s1 to s3 exist randomly. Moreover, a case where the interval s is 0 μm is also included and edges of some of the daylighting portions 3 among the daylighting portions 3 may be contact with each other.

By differentiating an arrangement interval between the adjacent daylighting portions 3, a ray of light incident on each of the daylighting portions 3 is reflected by an interface between the second surface 2b of the first base 2 and an air layer, and then incident on another daylighting portion 3 positioned lower than the daylighting portion 3 to which the light is incident. Compared to a configuration in which the daylighting portions 3 are arranged with a constant interval, regularity of the arrangement of the adjacent daylighting portions 3 is low in the present embodiment. Thus, a position at which light transmitted through the daylighting portion 3 is incident again on another daylighting portion 3 after being reflected by an interface changes. That is, due to a change in the optical path of the light transmitted through the daylighting film 1, the outgoing angle $\theta_{OUT}$ when the light is finally output to the room is distributed and a light flux of a peak of stray light glare output at the same angle is reduced.

As illustrated in FIG. 8, in the case of the daylighting film 1 of the present embodiment, the three intervals s1 to s3 are set as the arrangement interval between the plurality daylighting portions 3, so that the outgoing angle $\theta_{OUT}$ of outgoing light is able to be distributed into various angles (outgoing angle $\theta_{OUT(1)} \neq$ outgoing angle $\theta_{OUT(2)}$).

Figure 9:
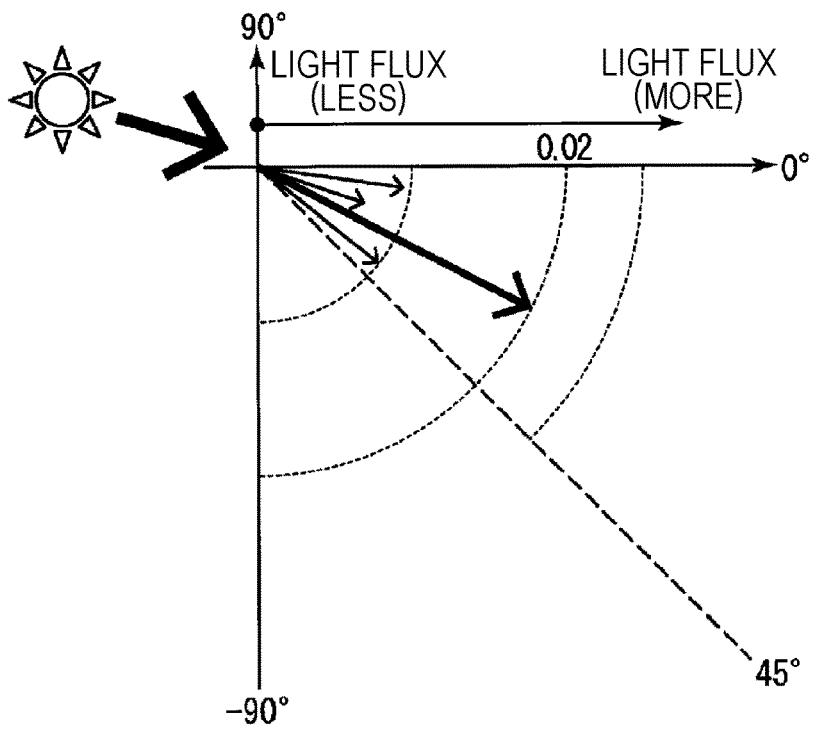
FIG. 9 is a view for explaining characteristics of the daylighting film of the embodiment.
Figure 10:
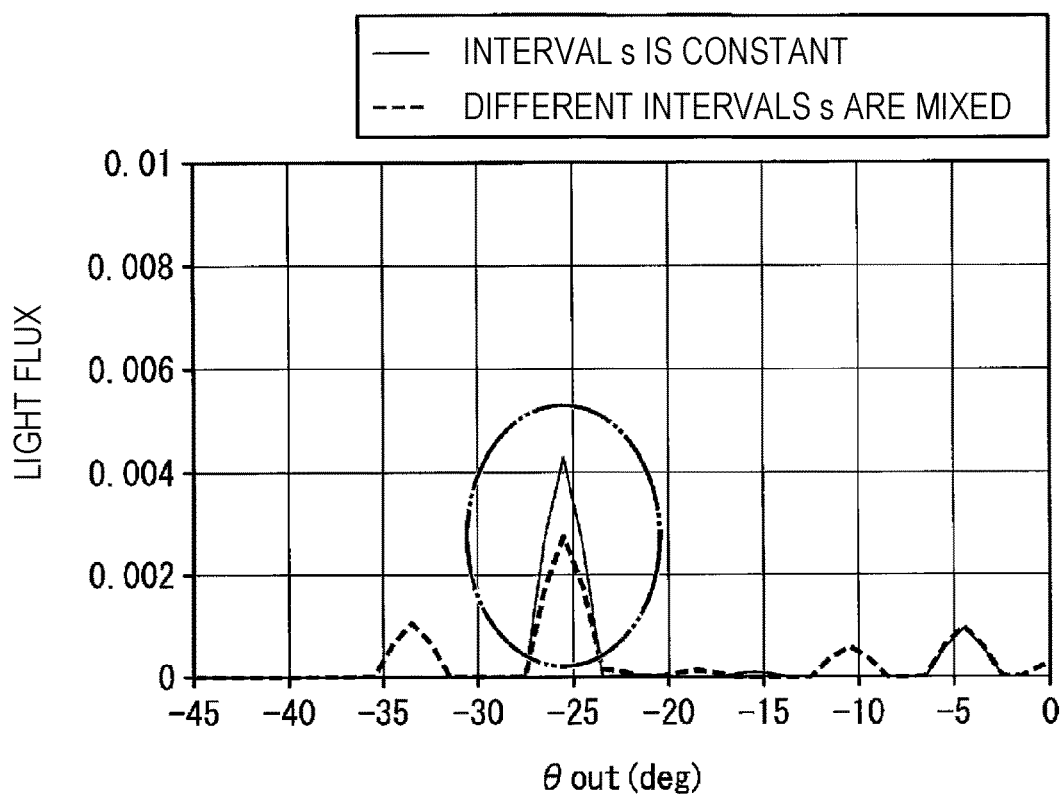
FIG. 10 illustrates a relationship between an outgoing angle and a light flux of stray light glare in the daylighting film of the embodiment of the present application and a daylighting film as a comparative example.

FIG. 9 is a view for explaining characteristics of the daylighting film 1 of the present embodiment. FIG. 10 illustrates a relationship between an outgoing angle and a light flux of stray light glare in the daylighting film of the embodiment of the present application and a daylighting film as a comparative example.

As illustrated in FIG. 9, among the outgoing rays of light $L_{OUT}$ output from the daylighting film 1, there are almost no rays of light exceeding a lower limit level at which a person is dazzled, in a range where the outgoing angle $\theta_{OUT}$ is $0° \leq \theta_{OUT} \leq -45°$. In the daylighting film 1 of the present embodiment, as illustrated in FIG. 10, the outgoing angle $\theta_{OUT}$ of the stray light glare $L_{OUT}$ concentrated at near $-26°$ in the conventional daylighting film 901 is able to be distributed to other angles. This makes it possible to reduce a light flux of a peak of stray light glare output at the same angle.

Figure 11:
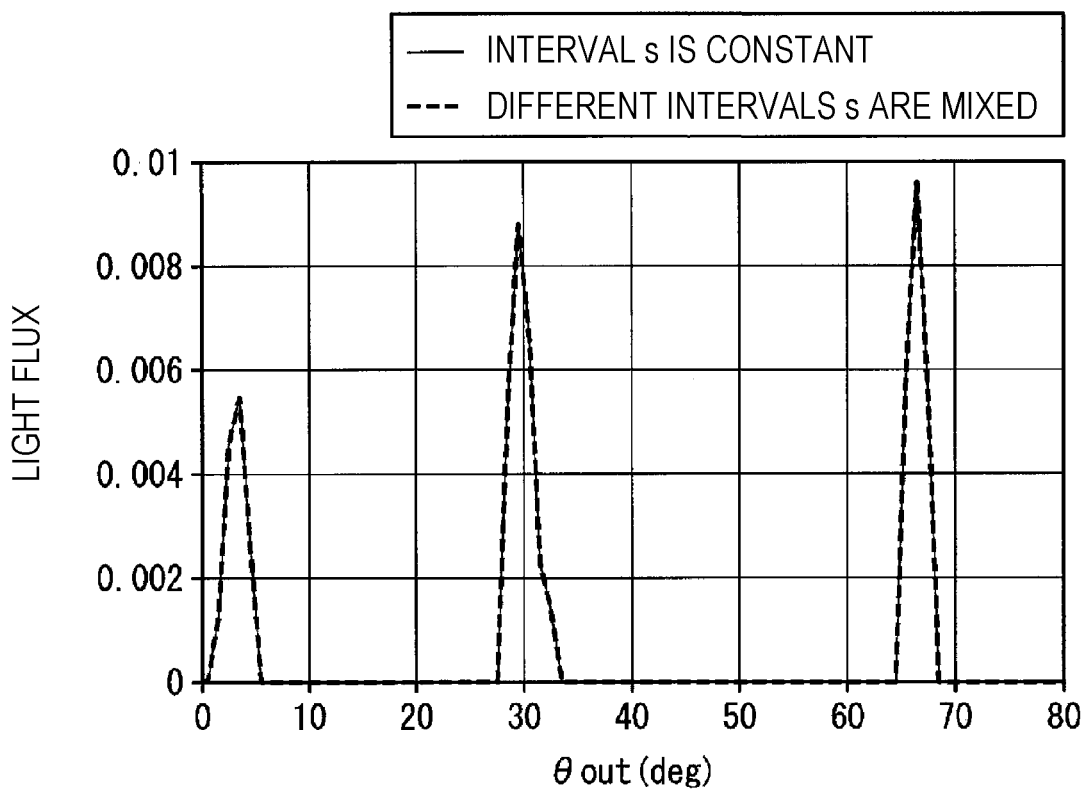
FIG. 11 illustrates a relationship between an outgoing angle and a light flux in daylighting in the daylighting film of the embodiment of the present application and a daylighting film as a comparative example.

FIG. 11 illustrates a relationship between an outgoing angle and a light flux in daylighting in the daylighting film of the embodiment of the present application and the daylighting film as the comparative example.

As illustrated in FIG. 11, daylighting characteristics of the daylighting film 1 are almost the same as daylighting characteristics of the daylighting film 901 as the comparative example, and there is no major change in a light flux of light output toward the ceiling in the room. That is, if the arrangement interval between the adjacent daylighting portions 3 is set to various values, a light flux in a daylighting direction is able to be kept.

As described above, according to the configuration of the present embodiment, rays of light forming a glare light flux are distributed to other angles, so that the daylighting film 1 that does not cause a person to be dazzled regardless of where the person is in the room is provided. In addition, the daylighting film 1 enables reduction of a light flux of a peak of stray light glare while almost keeping the daylighting characteristics.

Note that, the interval s between the adjacent daylighting portions 3 is set to three values in the present embodiment, but may be set to two different intervals or four or more intervals that are different from each other.

In the present embodiment, the daylighting film 1 is installed in such a manner that the surface where the microstructure is formed is the light incoming surface 1a and the light incoming surface 1a is directed to the window glass 1003 (outdoor) side, but may be installed in such a manner that the microstructure surface where the daylighting portions 3 are formed is directed to the indoor side as illustrated in FIG. 5C or 5D. Also in such a case, the daylighting film 1 enables rays of light forming a glare light flux to be distributed to other angles and does not cause a person to be dazzled regardless of where the person is in the room.

On the other hand, regarding the daylighting characteristics of the daylighting film 1, since the interval s between the adjacent daylighting portions 3 is set to various values including an interval larger or smaller than the conventional interval s, an increase or decrease is caused in a density of a daylighting structure per unit area, that is, an arrangement density of the daylighting portions 3 so that a light flux in a daylighting direction merely varies in proportion to the increase or decrease.

(Method of Manufacturing Daylighting Film)

Next, a method of manufacturing the daylighting film 1 will be described.

As a method of manufacturing a daylighting film, a molding method (die molding method) using a die is used. The daylighting film 1 of the present embodiment is formed by using a molding die 120 as illustrated in FIG. 12, for example.

Figure 12:
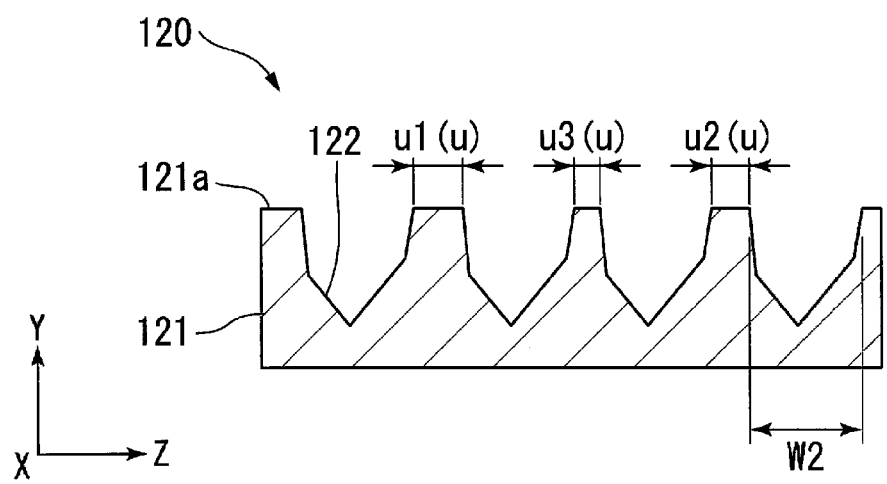
FIG. 12 illustrates a configuration of a molding die for manufacturing the daylighting film.
Figure 13:
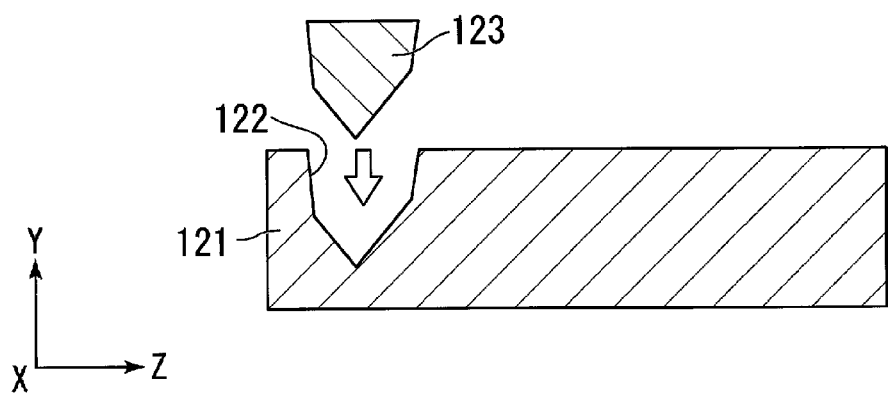
FIG. 13 illustrates a state where the molding die is produced.

FIG. 12 illustrates a configuration of the molding die for manufacturing the daylighting film. FIG. 13 illustrates a state where the molding die is produced.

The molding die 120 illustrated in FIG. 12 has a main portion 121 made of metal, and first recessed portions 122 formed on a side of one surface 121a of the main portion 121.

The molding die 120 has an inverted shape similar to a shape of the daylighting film 1. Thus, the first recessed portions 122 correspond to a shape of the daylighting portions 3 in the daylighting film 1.

Further, an interval u between adjacent first recessed portions 122 is set to various values according to the interval s between the daylighting portions 3 in the daylighting film 1. In the present embodiment, three different intervals u are set and a relation of interval u1>interval u2>interval u3 is provided. The interval u1 is equal to the aforementioned interval s1, the interval u2 is equal to the aforementioned interval s2, and the interval u3 is equal to the aforementioned interval s3.

Note that, in a case where the interval s between the daylighting portions 3 is set to two or four or more values in the daylighting film 1, the interval u between the first recessed portions 122 is set to various values accordingly.

As illustrated in FIG. 13, the molding die 120 of the present embodiment is produced by cutting the main portion 121 made of rectangular parallelepiped metal with use of a die cutting bite 123 that has a shape similar to an external shape of each of the daylighting portions 3 and thereby forming the first recessed portions 122 corresponding to the daylighting portions 3.

Figure 14:
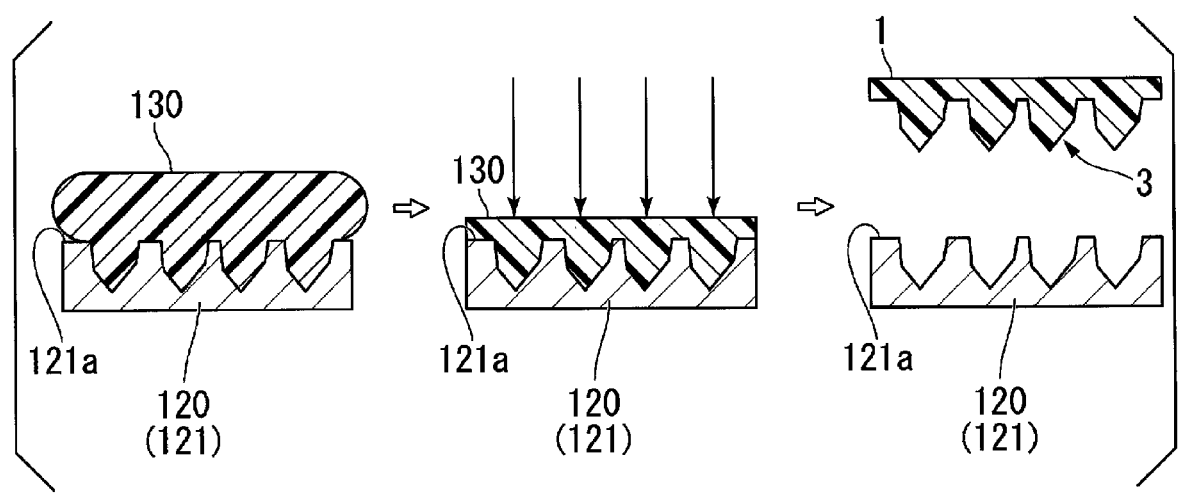
FIG. 14 illustrates steps of manufacturing the daylighting film by using the molding die of the embodiment.

FIG. 14 illustrates steps of manufacturing the daylighting film 1 by using the molding die 120 of the present embodiment.

In a case where the daylighting film 1 of the present embodiment is manufactured by using the molding die 120 described above, first, as illustrated in FIG. 14, resin 130 to form a daylighting structure is applied to one surface 121a of the molding die 120, on which the first recessed portions 122 are formed, and the respective first recessed portions 122 are filled with the resin 130. As the resin 130, thermosetting resin or photosetting resin is used.

Next, when the resin 130 is thermosetting resin, the resin 130 is cured by hot press processing to be formed into a film shape. Alternatively, when the resin 130 is photosetting resin, the resin 130 is irradiated with light and cured to be formed into a film shape.

After that, the resin 130 that is cured is separated from the molding die 120 and the daylighting film 1 in which the daylighting portions 3 are formed is obtained.

The daylighting film 1 of the present embodiment does not require an additional configuration or additional manufacturing process compared to the conventional daylighting films 901 and 904, and is thus able to be manufactured without requiring costs and time.

Second Embodiment

Next, a configuration of a daylighting film 21 of a second embodiment of the invention will be described.

A basic configuration of the daylighting film 21 of the present embodiment described below is substantially similar to that in the first embodiment, but is different therefrom in that an upper limit value of the interval s between daylighting portions is set. Thus, in the following description, a part different from the foregoing embodiment will be specifically described and description for a common part will be omitted. Moreover, in the respective figures used in the description, a component common to that in the figure used for the description of the foregoing embodiment will be given the same reference sign.

Figure 15:
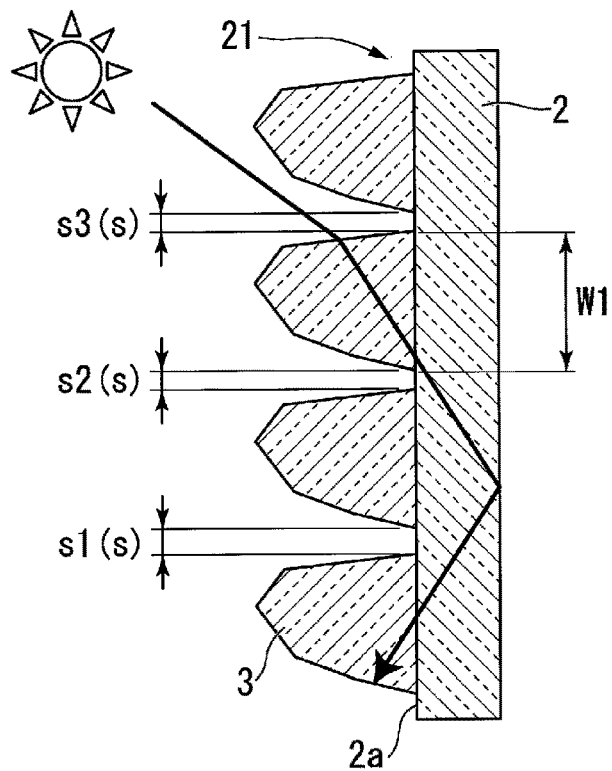
FIG. 15 is a sectional view schematically illustrating a daylighting film of a second embodiment.

FIG. 15 is a sectional view schematically illustrating the daylighting film 21 of the second embodiment.

As illustrated in FIG. 15, in the daylighting film 21 of the present embodiment, each of the intervals s1 to s3 between the adjacent daylighting portions 3 is set to an interval narrower than a width W1 in a direction intersecting a direction of the daylighting portion 3 extending (W1>s1>s2>s3). When such a relation is satisfied, rays of glare light output from the daylighting film 21 are output by being distributed to multiple angles.

Figure 16:
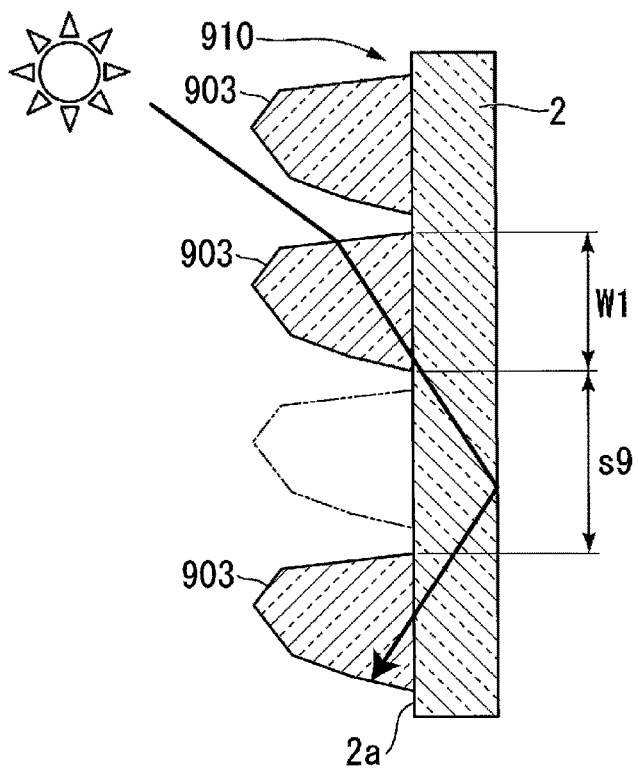
FIG. 16 is a sectional view illustrating a schematic configuration of a daylighting film as a comparative example.

Meanwhile, FIG. 16 is a sectional view illustrating a schematic configuration of a daylighting film 910 as a comparative example.

As illustrated in FIG. 16, the daylighting film 910 as the comparative example has a region where no daylighting portion 903 is arranged. In the region, the interval s between adjacent daylighting portions 903 among the daylighting portions 903 has a largest value in the daylighting film 910. The interval s is indicated by a reference sign s9 in the figure. The interval s9 is wider than a width W1 in a direction intersecting a direction of the daylighting portion 903 extending (W1<s9). In a case of such a configuration, the number of daylighting portions 903 is reduced and a daylighting function as the daylighting film 910 is lowered accordingly.

Thus, an upper limit of the interval s between the adjacent daylighting portions 3 in the daylighting film 21 is set to be the width W1 of the daylighting portion 3 (s<W1). This makes it possible to obtain a glare suppressing effect without lowering a daylighting function in the daylighting film 21.

Third Embodiment

Next, an outline of a daylighting film of a third embodiment of the invention will be described.

A basic configuration of the daylighting film of the present embodiment described below is substantially similar to that in the first embodiment, but is different therefrom in that a lower limit value of the interval s between the adjacent daylighting portions 3 is set. Thus, in the following description, a part different from the foregoing embodiment will be specifically described and description for a common part will be omitted. Moreover, in the respective figures used in the description, a component common to that in the figure used for the description of the foregoing embodiments will be given the same reference sign.

Since a light flux of stray light glare output from the daylighting film 1 changes depending on a protrusion structure in the daylighting film 1 or a position (orientation, altitude) of the sun, it is difficult to geometrically calculate a change in a luminance ratio by the interval s between the daylighting portions 3.

Then, by examining what the interval s between the adjacent daylighting portions 3 in the daylighting film 1 is to be set to enable visually recognizing reduction of rays of light that become stray light glare, a lower limit value of the interval s is set.

Figure 17A:
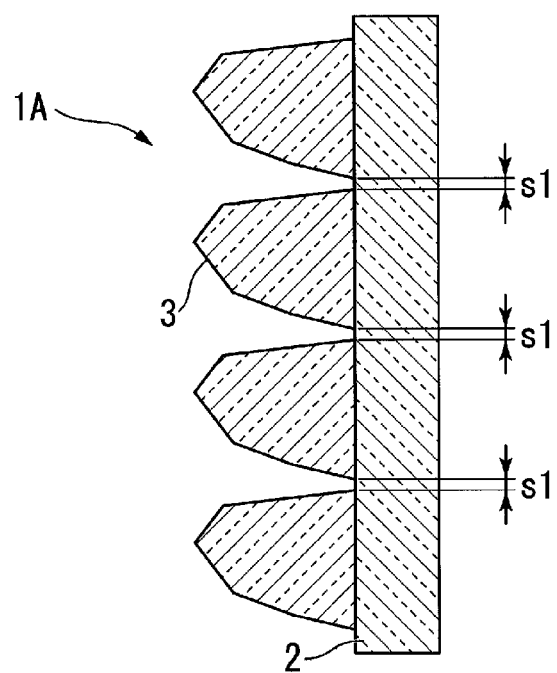
FIG. 17A illustrates a configuration of a daylighting film as a comparative example 1.
Figure 17B:
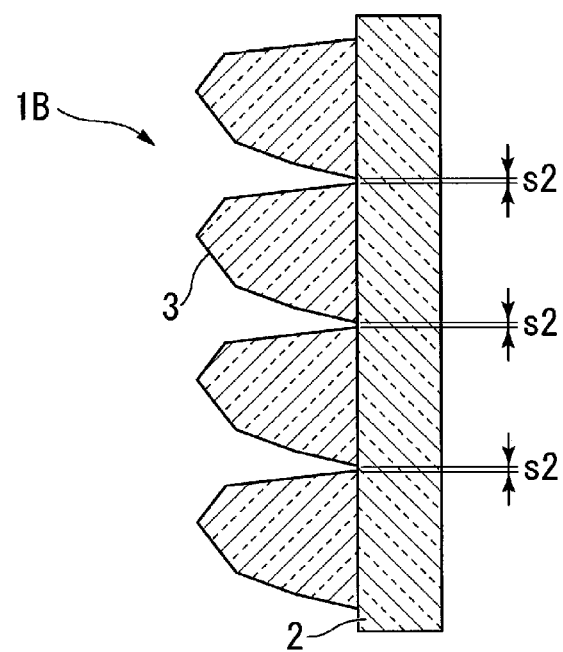
FIG. 17B illustrates a configuration of a daylighting film as a comparative example 2.

FIG. 17A illustrates a configuration of a daylighting film 1A as a comparative example 1. FIG. 17B illustrates a configuration of a daylighting film 1B as a comparative example 2.

First, two daylighting films 1A and 1B that are different in the interval between the adjacent daylighting portions 3 are prepared. As illustrated in FIG. 17A, in the first daylighting film 1A, the daylighting portions 3 are arranged with an equal interval (constant at the interval s1). As illustrated in FIG. 17B, in the second daylighting film 1B, the daylighting portions 3 are arranged with an equal interval (constant at the interval s2). Here, the interval s2 has a value smaller than that of the interval s1 and also includes a case where the interval s has a value of 0.

Figure 18:
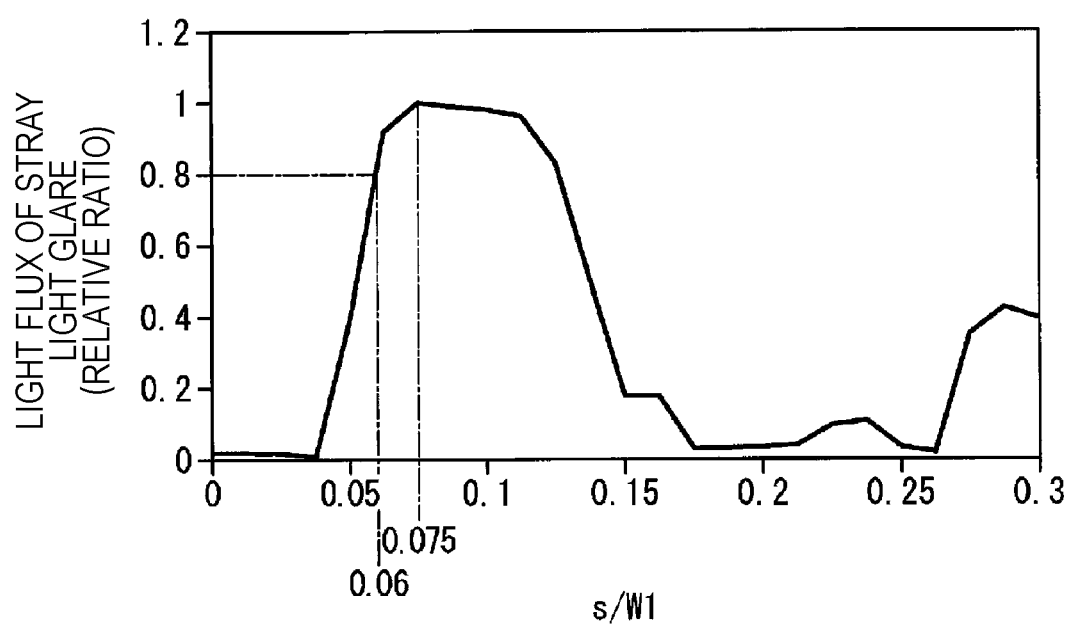
FIG. 18 illustrates a light flux of glare light output at a specific angle in the two daylighting films (comparative examples 1 and 2).

FIG. 18 illustrates a light flux of rays of glare light output at a specific angle in the two daylighting films 1A and 1B described above. In FIG. 18, a vertical axis indicates a light flux of stray light glare (relative ratio) and a horizontal axis indicates a ratio (s/W1) between the interval s between the daylighting portions 3 and the width W1.

For example, in a case where the width W1 of each of the daylighting portions 3 is 150 µm, the interval s1=6.0 µm, and the interval s2=4.8 µm, the light flux of the stray light glare becomes maximum when s1/W1 is 0.075, and the light flux of the stray light glare becomes 0.8 times of the maximum when s2/W1 is 0.06.

Here, a level at which the person in the room is able to realize that the glare light flux is reduced is achieved when a relative luminance ratio that human eyes are able to identify is 20% with photopic vision. That is, when a daylighting film includes a part where the luminance is lower than that in a brightest part by 20%, it is possible to understand that there is a difference of the luminance ratio, so that the stray light glare is improved.

When the daylighting portions 3 are arranged in one daylighting film 1 so as to include the interval s1 and the interval s2 that achieve the ratio of the light flux of 20%, it is possible to expect reduction of a peak of the glare light flux.

Thus, a configuration is provided in which at least a set of intervals s (various values) between the daylighting portions 3 on the daylighting film 1 (first base 2) satisfies the following condition.

$$\frac{s1-s2}{W1} \geq 0.015 \qquad \text{[Math. 3]}$$

Here, s1 and s2 are two of the intervals s between the daylighting portions 3 on the first base 2 and s1 represents a value larger than s2 (s1>s2).

In the present embodiment, it is preferable that a difference of a ratio between the interval s1 and the interval s2 of the daylighting portions 3 is 1.5% or more. Thereby, when the width W1 of each of the daylighting portions 3 is 150 µm, the difference of the ratio of the interval s1 and the interval s2 with respect to the width W1 corresponds to 2.25 µm.

(Molding Die)

As illustrated in FIG. 12, the molding die 120 for forming the daylighting film 1 has a configuration in which each of the intervals u1 to u3 between the first recessed portions 122 in the main portion 121 is smaller than the width W2 in a direction (Z direction) interesting a direction (X direction) of extending the first recessed portion 122 and a relation of each of the intervals u1 to u3<width W2 is satisfied.

In the molding die 120 for forming the daylighting film 1 described above, at least a set of the intervals u (various values) in the molding die 120 preferably satisfies the following condition.

$$\frac{u1-u2}{W2} \geq 0.015 \qquad \text{[Math. 4]}$$

Here, u1 and u2 are two of the intervals u between the first recessed portions 122 in the main portion 121 and u1 represents a value larger than u2 (u1>u2).

Use of such a molding die 120 makes it possible to obtain the daylighting film 1 that is effective for reduction of a light flux of a peak of stray light glare.

Fourth Embodiment

Next, a configuration of a daylighting film 41 of a fourth embodiment of the invention will be described.

A basic configuration of the daylighting film 41 of the present embodiment described below is substantially similar to that in the first embodiment, but is different therefrom in that the daylighting film 41 further includes small structures 44. Thus, in the following description, a part different from the foregoing embodiments will be specifically described and description for a common part will be omitted. Moreover, in the respective figures used in the description, a component common to that in the figure used for the description of the foregoing embodiments will be given the same reference sign.

Figure 19:
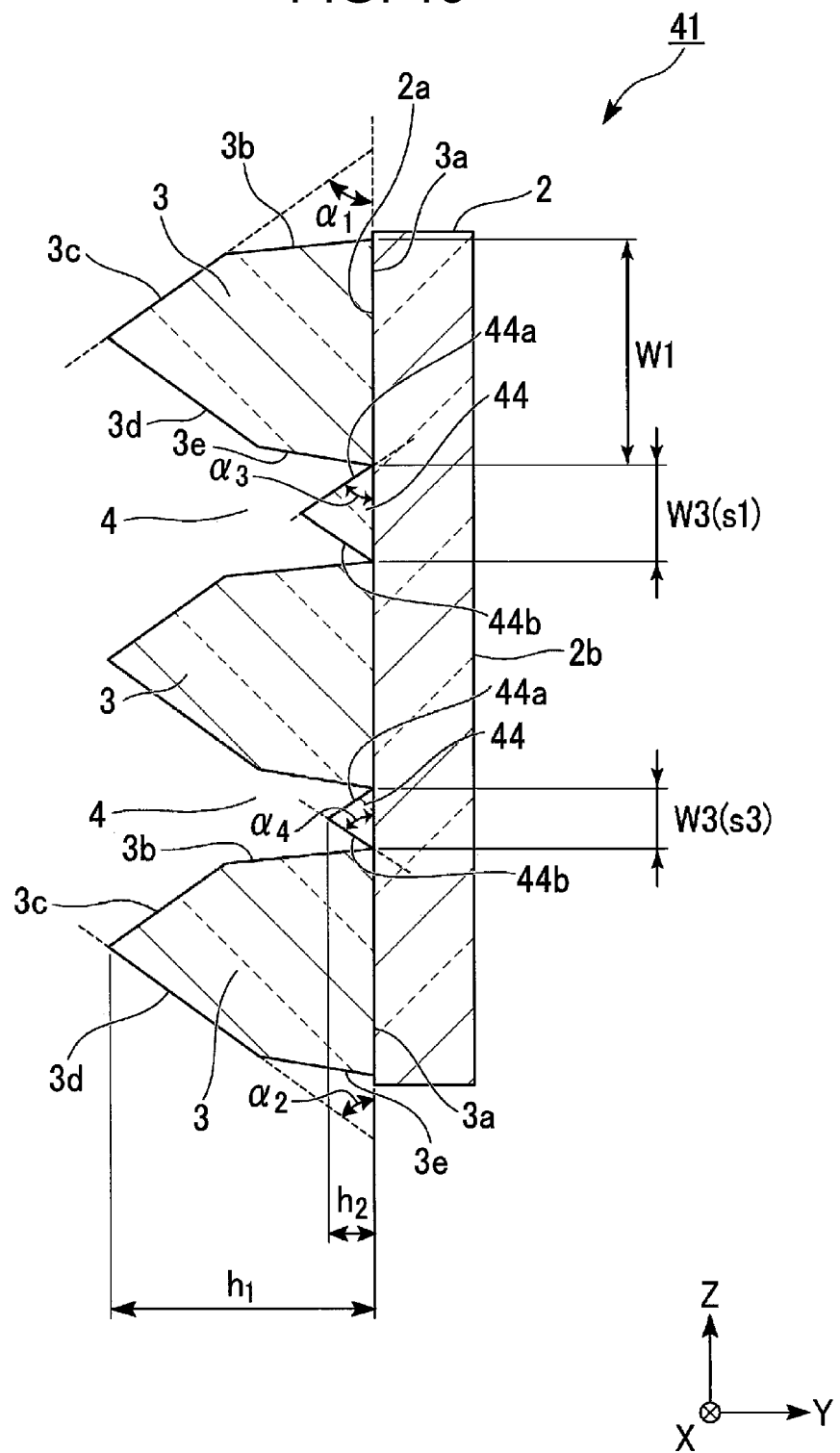
FIG. 19 is a sectional view partially illustrating a schematic configuration of a daylighting film of a fourth embodiment.

FIG. 19 is a sectional view partially illustrating a schematic configuration of the daylighting film 41 of the fourth embodiment.

As illustrated in FIG. 19, the daylighting film 41 of the present embodiment is configured in such a manner that a small structure 44 having optical transparency is provided between the adjacent daylighting portions 3. The small structure 44 is provided to be adjacent to the daylighting portions 3 and is made of the same material as that of the daylighting portions 3.

In the daylighting film 41, a height $h_2$ (a height $h_2$ of the small structure 44 in a direction (Y direction) normal to the first base 2) of the small structure 44 from the first surface 2a of the first base 2 is lower than a height $h_1$ (a height $h_1$ of the daylighting portions 3 in the direction (Y direction) normal to the first base 2) of the daylighting portion 3 from the first surface 2a of the first base 2. In the daylighting film 41, the small structure 44 is arranged in a gap 4 between the daylighting portions 3. (A width W3 may be equal to or less than the interval s.)

The daylighting portion 3 has a pair of surfaces 3c and 3d that are inclined in directions different from each other relative to the first surface 2a of the first base 2 and that face each other in a direction of the daylighting portions 3 being arranged, and a pair of surfaces 3b and 3e that face each other in the direction of the daylighting portions 3 being arranged.

The small structure 44 has a pair of inclined surfaces 44a and 44b that are inclined in directions different from each other relative to the first surface 2a of the first base 2 and that face each other in the direction of the daylighting portions 3 being arranged (small structures 44).

When an angle formed by the surface 3c of the daylighting portion 3 and the first surface 2a of the first base 2 is an angle α1, angles α1 of the daylighting portions 3 are all equal. When an angle formed by the surface 3d of the daylighting portion 3 and the first surface 2a of the first base 2 is an angle α2, angles α2 of the daylighting portions 3 are all equal. The angle α1 of the daylighting portion 3 is, for example, 600 to 800. The angle α2 of the daylighting portion 3 is, for example, 350 to 600.

When a width of the small structure 44 in a transverse direction is W3, values of widths W3 of the small structures 44 in the present embodiment in the transverse direction are not all equal. Similarly to the foregoing embodiments, the interval s between the daylighting portions 3 is set to various values and three intervals (interval s1>interval s2>interval s3) are set, for example. Additionally, though the foregoing embodiment is configured in such a manner that the interval s1, the interval s2, and the interval s3 exist in this order in a top-bottom direction (Z direction) of the daylighting film 41, the interval s2 (not illustrated), the interval s1, and the interval s3 exist in this order in the top-bottom direction (Z direction) of the daylighting film 41 in the present embodiment. Note that, the order of the intervals s1, s2 (not illustrated), and s3 that are different from each other is appropriately set depending on intended use.

Thus, the width W3 of the small structure 44 in the transverse direction may not be equal to the interval s between the daylighting portions 3. The small structure 44 is arranged in a range where the height $h_2$ of the small structure 44 is lower than the height $h_1$ of the daylighting portion 3. The width W3 of the small structure 44 in the transverse direction is also set to three values. The width W3 of each of the small structures 44 in the transverse direction is smaller than the width W1 of the daylighting portion 3 in a transverse direction (W3<W1).

The small structure 44 has a shape almost similar to a shape of a front end side of the daylighting portion 3, that is, a part having one pair of surfaces 3c and 3d. When an angle formed by the inclined surface 44a of the small structure 44 and the first surface 2a of the first base 2 is an angle α3, angles α3 of the small structures 44 are almost equal. When an angle formed by the inclined surface 44b of the small structure 44 and the first surface 2a of the first base 2 is an angle α4, angles α4 of the small structures 44 are almost equal. The angle α3 of the small structure 44 is almost equal to the angle α1 of the daylighting portion 3. The angle α4 of the small structure 44 is almost equal to the angle α2 of the daylighting portion 3.

Figure 20A:
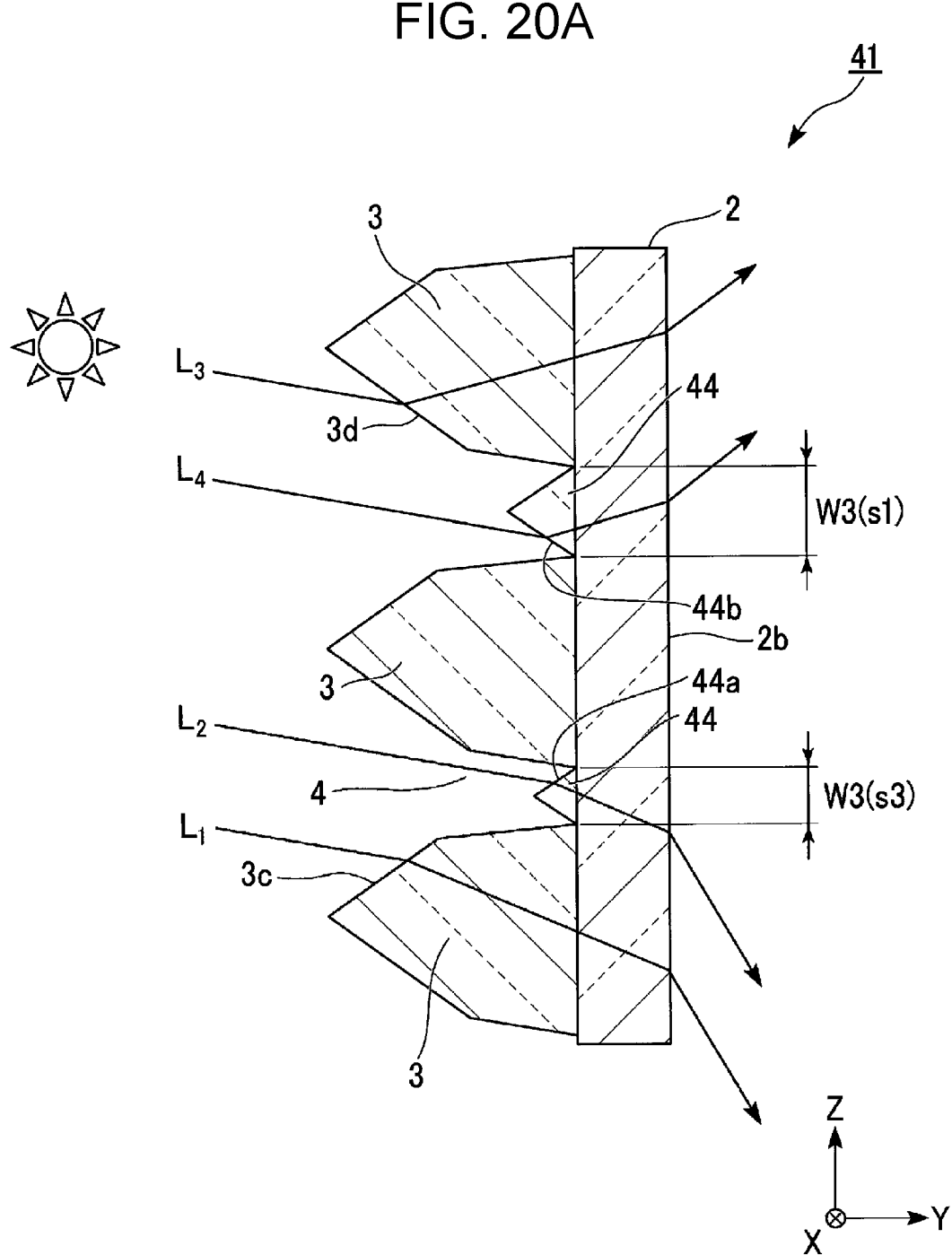
FIG. 20A illustrates an optical path of light transmitted through a part of the daylighting film in the fourth embodiment.

FIG. 20A illustrates an optical path of light transmitted through the daylighting film 41 in the fourth embodiment.

Figure 20B:
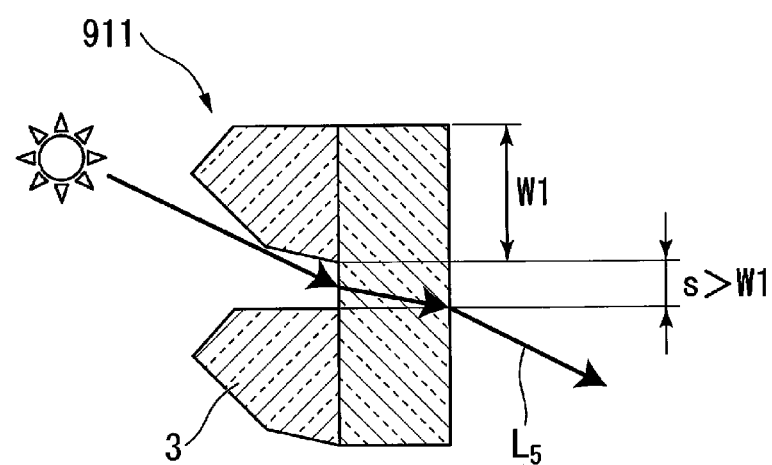
FIG. 20B illustrates an optical path of light transmitted through a daylighting film having a region where no small structure exists.

FIG. 20B illustrates an optical path of light transmitted through a daylighting film 911 having a region where no small structure exists.

As illustrated in FIG. 20A, for example, among rays of light coming from an upper side of the daylighting film 41, light $L_1$ incident from the surface 3c of the daylighting portion 3 is refracted by the second surface 2b of the first base 2 and output toward a lower side of the daylighting film 41. As a result, rays of light output from the first base 2 do not become glare (the outgoing angle is −45° or less and the rays of light pass below a glare range).

In comparison, in the daylighting film 911 illustrated in FIG. 20B, the interval s between the adjacent daylighting portions 3 is larger than the width W1 of each of the daylighting portions 3 in the transverse direction. A ray of light $L_5$ passing through the position where no small structure 44 exists in the daylighting film 911 is output from the second surface 2b and then becomes glare.

On the other hand, among rays of light coming from the upper side of the daylighting film 41 illustrated in FIG. 20A, light $L_3$ incident from the surface 3d of the daylighting portion 3 into the daylighting portion 3 is refracted by the second surface 2b of the first base 2 and output toward the upper side of the daylighting film 41.

Additionally, among the rays of light coming from the upper side of the daylighting film 41, light $L_4$ incident into the small structure 44 from the inclined surface 44b of the small structure 44 is refracted by the second surface 2b of the first base 2 and output toward the upper side of the daylighting film 41.

The light output toward the upper side of the daylighting film 41 as described above is guided to the ceiling in the room or the deep inside of the room and illuminates the inside of the room brightly.

In the daylighting film 41 of the present embodiment, between the daylighting portions 3 adjacent on the first surface 2a of the first base 2, the small structures 44 made of the same material as that of the daylighting portions 3 and having a shape almost similar to a tapered shape of the daylighting portions 3 are provided, and the angle α3 of the small structure 44 is almost equal to the angle α1 of the daylighting portion 3 and the angle α4 of the small structure 44 is almost equal to the angle α2 of the daylighting portion 3.

Thus, the light $L_2$ and $L_4$ incident into the small structures 44 is able to be output toward the upper side of the daylighting film 41 similarly to the light $L_1$ and $L_3$ incident into the daylighting portions 3. As a result, it is possible to allow external light to travel toward the ceiling in the room and suppress a case where the person in the room is dazzled.

(Molding Die)

Figure 21:
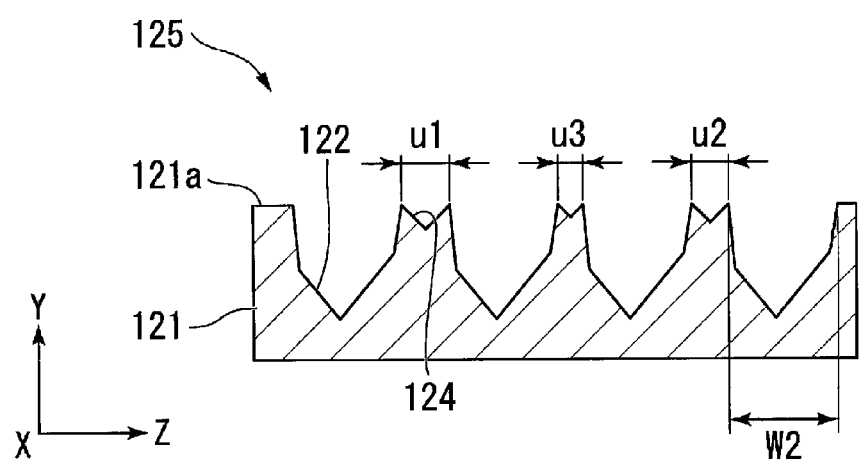
FIG. 21 illustrates a configuration of a molding die for manufacturing the daylighting film in the fourth embodiment.

FIG. 21 illustrates a configuration of a molding die for manufacturing the daylighting film in the fourth embodiment.

As illustrated in FIG. 21, a molding die 125 has an inverted shape similar to a shape of the daylighting film 41 in the present embodiment. On a side of one surface 121a of the main portion 121, first recessed portions 122 corresponding to shapes of the daylighting portions 3 and second recessed portions 124 corresponding to shapes of the small structures 44 are formed.

Each of the second recessed portions 124 is formed between adjacent first recessed portions 122. An interval u between adjacent first recessed portions 122 is set to various values in accordance with the interval s between the daylighting portions 3 in the daylighting film 1 and sizes of the respective second recessed portions 124 are also different in accordance with shapes of the small structures 44 in the daylighting film 41.

In a case where the daylighting film 41 of the present embodiment is manufactured by using the molding die 125 described above, the daylighting film 41 is obtained by applying resin to the molding die 125 and performing hot press processing or curing with light irradiation for the resin, similarly to the foregoing embodiment.

Note that, the small structure 44 has optical transparency in the present embodiment, but there is no limitation thereto and the small structure 44 may have light absorbability.

Additionally, the small structure 44 is formed of the same material as that of the daylighting portion 3 (first base 2) in the present embodiment, but may be formed of a material different from that of the first base 2.

Note that, though a case where one small structure 44 is provided in each of the intervals s between the daylighting portions 3 is exemplified in the present embodiment, the present embodiment is not limited thereto.

Figure 22A:
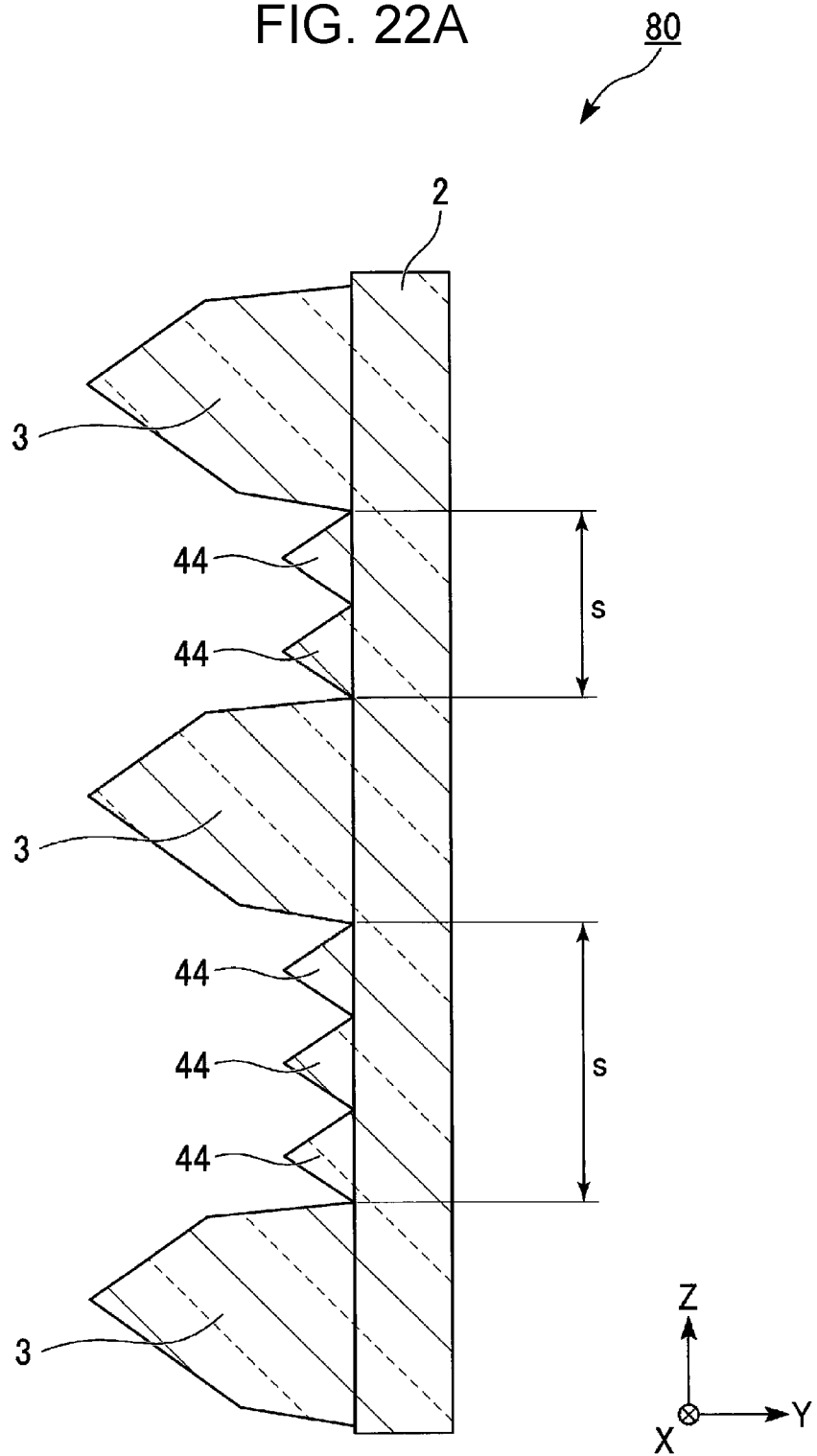
FIG. 22A illustrates a configuration in which small structures are provided in an interval between adjacent daylighting portions.
Figure 22B:
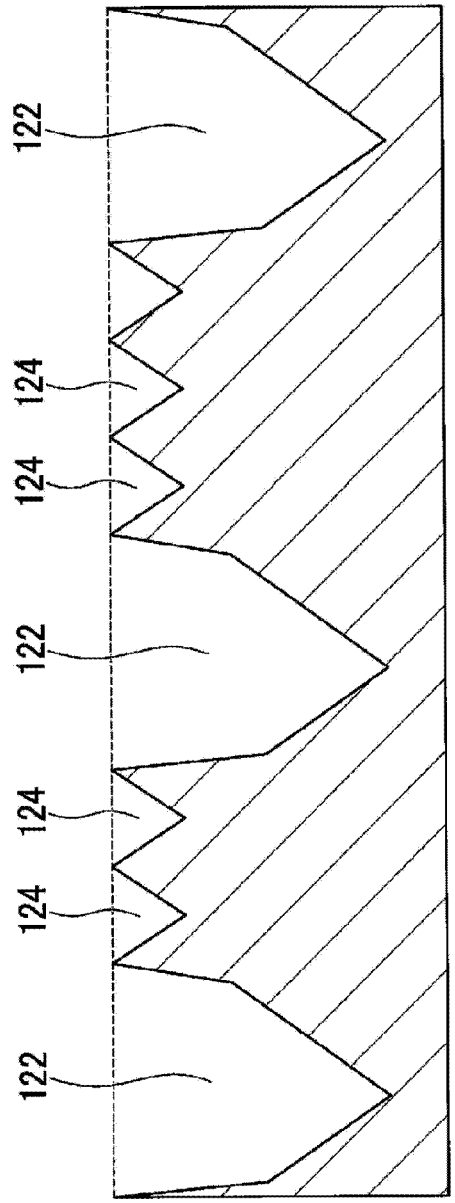
FIG. 22B illustrates a configuration of a molding die having second recessed portions in an interval between adjacent first recessed portions.

For example, as illustrated in FIG. 22A, two or more small structures 44 may be provided in at least one of the intervals s between the daylighting portions 3. Such a daylighting film 80 is able to be obtained by using a molding die 126 illustrated in FIG. 22B.

In addition, as illustrated in FIG. 22C, in at least one of the intervals s between the daylighting portions 3, the small structure 44 having the width W3 smaller than the interval s may be provided. That is, there may be a part where the interval s between the adjacent daylighting portions 3 is wider than the width W3 of the small structure 44. Such a daylighting film 81 is able to be obtained by using a molding die 127 illustrated in FIG. 22D.

Fifth Embodiment

Next, a configuration of a daylighting film of a fifth embodiment of the invention will be described.

A basic configuration of the daylighting film of the present embodiment described below is substantially similar to that in the first embodiment, but is different therefrom in distribution of the interval s in the daylighting film. Thus, in the following description, a part different from the foregoing embodiments will be specifically described and description for a common part will be omitted. Moreover, in the respective figures used in the description, a component common to that in the figure used for the description of the foregoing embodiments will be given the same reference sign.

FIGS. 23A to 23F are histograms illustrating distribution of the intervals in the daylighting film. A horizontal axis indicates the intervals s and a vertical axis indicates a frequency of the intervals in the daylighting film.

Figure 23A:
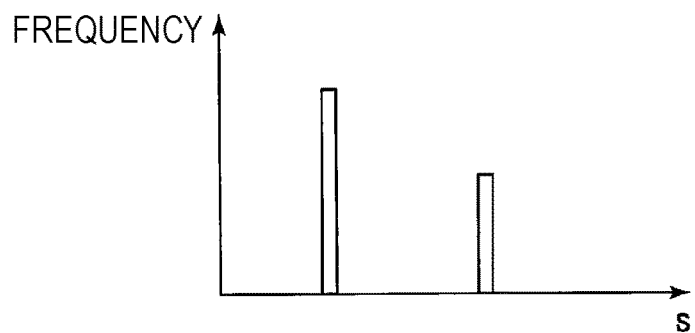
FIG. 23A is a histogram illustrating distribution of intervals in the daylighting film.
Figure 23B:
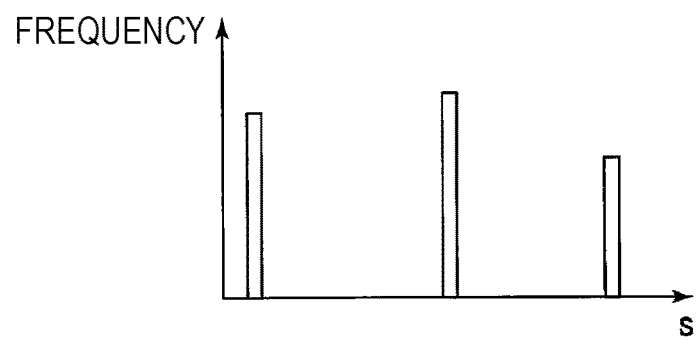
FIG. 23B is a histogram illustrating distribution of intervals in the daylighting film.
Figure 23C:
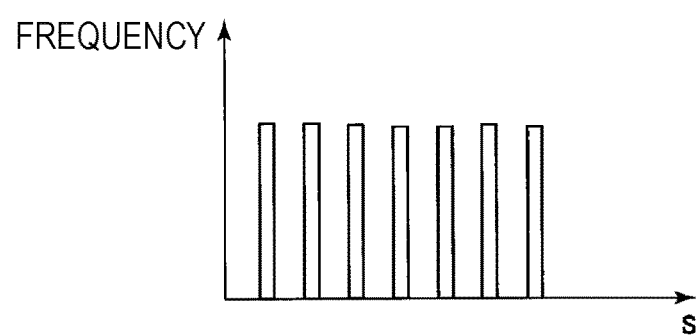
FIG. 23C is a histogram illustrating distribution of intervals in the daylighting film.
Figure 23D:
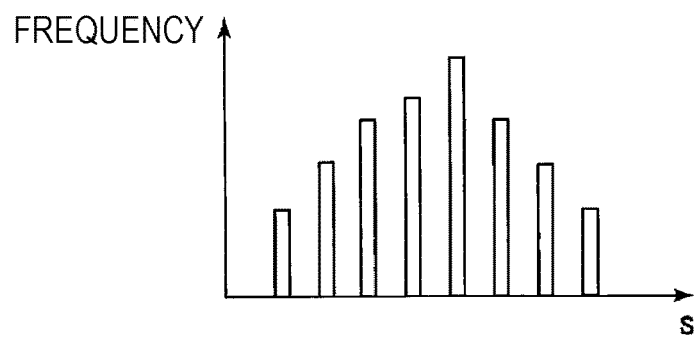
FIG. 23D is a histogram illustrating distribution of intervals in the daylighting film.
Figure 23E:
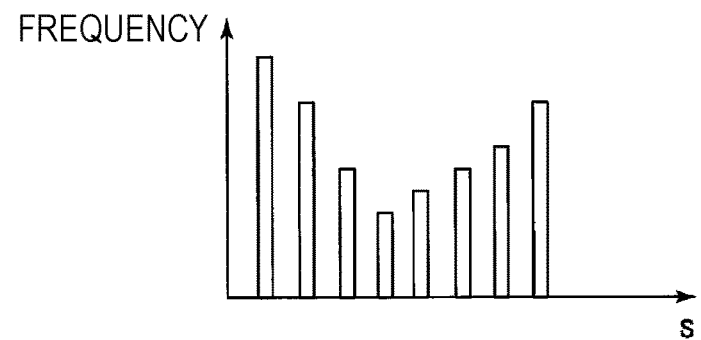
FIG. 23E is a histogram illustrating distribution of intervals in the daylighting film.
Figure 23F:
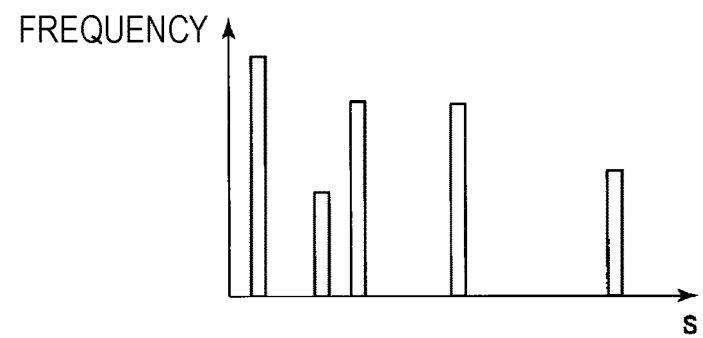
FIG. 23F is a histogram illustrating distribution of intervals in the daylighting film.

As a variation of the distribution of the intervals s in the daylighting film, the distribution may be provided with a given interval as illustrated in FIGS. 23A and 23B. The intervals may be distributed equally at the same frequency in a certain degree of range as illustrated in FIG. 23C. The distribution may be provided so that the frequency continuously increases or decreases with respect to the intervals s as illustrated in FIGS. 23D and 23E. The intervals s may be distributed completely randomly as illustrated in FIG. 23F.

Since an optical path of stray light glare varies depending on the microstructure (a shape of the daylighting portion) in the daylighting film, the interval s between the daylighting portions may be appropriately set in accordance with the microstructure so that an outgoing angle of the stray light glare is distributed.

Next, distribution of luminance based on arrangement of the intervals in the daylighting film will be described.

Figure 24:
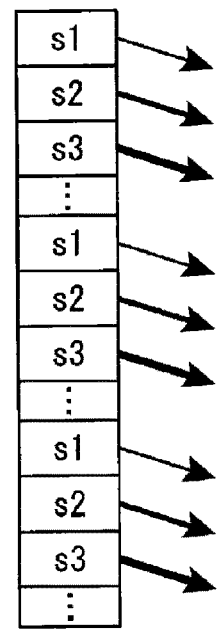
FIG. 24 illustrates an optical path and luminance in a daylighting film in which intervals s1 to s3 are repeatedly arranged in this order.

FIG. 24 illustrates an optical path and luminance in the daylighting film in which the intervals s1 to s3 are repeatedly arranged in this order.

As illustrated in FIG. 24, in a case where, for example, the intervals s1 to s3 are regularly and repeatedly arranged in the daylighting film, outgoing light with different luminance is output from the daylighting film in accordance with a value of each of the intervals s1 to s3. In this case, the person in the room sees the daylighting film (daylighting device) at a distance away from the daylighting film by about several meters and thus sees light with averaged luminance in a certain degree of region (a region including at least each of the interval s1 to interval s3 by one).

Figure 25:
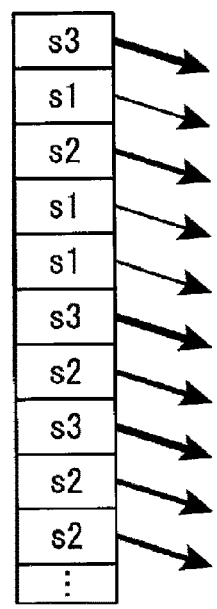
FIG. 25 illustrates an optical path and luminance in a daylighting film in which the intervals s1 to s3 are randomly arranged.

FIG. 25 illustrates an optical path and luminance in a daylighting film in which the intervals s1 to s3 are randomly arranged.

As illustrated in FIG. 25, in a case of a configuration in which, for example, the intervals s1 to s3 are randomly arranged in the daylighting film, outgoing light with different luminance is randomly output. In a case where the person in the room sees the daylighting film, the person sees light with uniform luminance.

Figure 26:
FIG. 26 illustrates an optical path and luminance in a daylighting film in which the intervals s1 to s3 are collectively arranged in respective areas.

FIG. 26 illustrates an optical path and luminance in the daylighting film in which the intervals s1 to s3 are collectively arranged in respective areas.

As illustrated in FIG. 26, in a case of a configuration in which an area A1 where intervals s1 are arranged, an area A2 where intervals s2 are arranged, and an area A3 where intervals s3 are arranged are provided in the daylighting film, light with different luminance is output from each of the areas A1, A2, and A3. In this case, light output from the daylighting film exhibits different distribution of luminance for each of the areas A1, A2, and A3.

As described above, the distribution of luminance by stray light glare varies depending on a manner in which the intervals s that are set are arranged, so that the arrangement may be set in accordance with intended use.

Sixth Embodiment

Next, a configuration of a daylighting film of a sixth embodiment of the invention will be described.

A basic configuration of the daylighting film of the present embodiment described below is substantially similar to that in the first embodiment, but is different therefrom in that a design property is provided to outgoing light from the daylighting film. Thus, in the following description, a part different from the foregoing embodiments will be specifically described and description for a common part will be omitted. Moreover, in the respective figures used in the description, a component common to that in the figure used for the description of the foregoing embodiments will be given the same reference sign.

Figure 27:
FIG. 27 illustrates an exemplary arrangement of intervals in a daylighting film.
Figure 28:
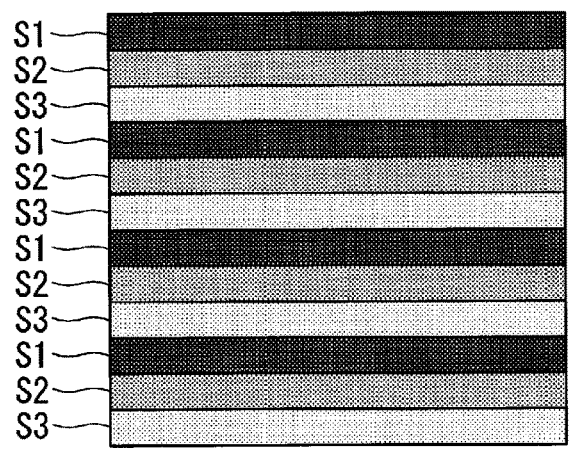
FIG. 28 illustrates a state where the daylighting film illustrated in FIG. 27 is seen from a person in a room.

FIG. 27 illustrates an exemplary arrangement of intervals in a daylighting film. FIG. 28 illustrates a state where the daylighting film illustrated in FIG. 27 is seen from the person in the room.

As illustrated in FIG. 27, in a case of a configuration in which, for example, the intervals s1 to s3 are repeatedly arranged in this order in the daylighting film, when the person in the room sees the daylighting film, luminance (brightness) of outgoing light varies in accordance with a size of the intervals s1 to S3, as illustrated in FIG. 28.

In this manner, by adjusting the arrangement of the intervals s in the daylighting film in each of the areas A1, A2, and A3, a difference in brightness of an outgoing light flux of stray light glare is able to be utilized, thus making it possible to provide any design property to the daylighting film.

Seventh Embodiment

Next, a configuration of a daylighting film of a seventh embodiment of the invention will be described by taking Examples 1 to 3 as an example.

Example 1

Figure 29:
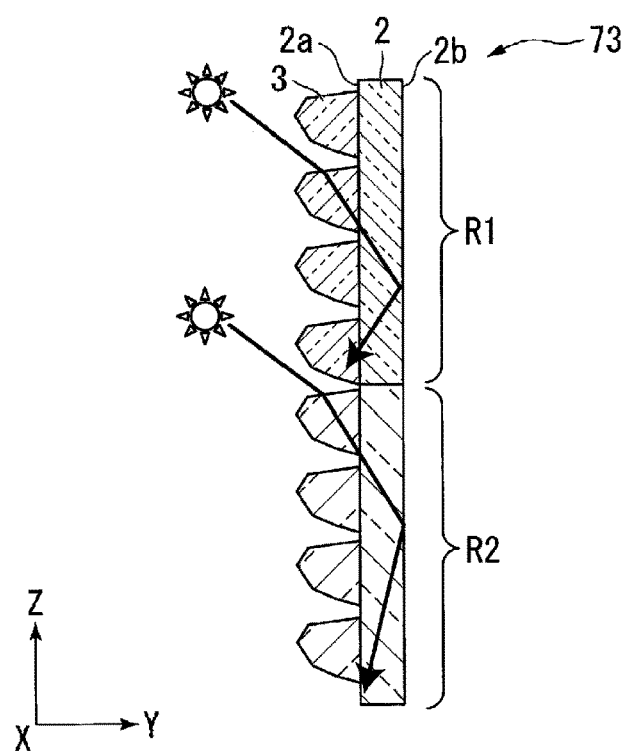
FIG. 29 illustrates a configuration of a daylighting film of Example 1.

FIG. 29 illustrates a configuration of a daylighting film of Example 1.

A daylighting film 73 illustrated in FIG. 29 has a configuration in which a refractive index in the daylighting film 73 has distribution. Specifically, the daylighting film 73 in the present example is formed by using materials having different refractive indexes for the respective regions, and has a first region R1 formed by using a material with a refractive index n1 and a second region R2 formed by using a material with a refractive index n2.

Such a configuration makes it possible to make a difference between an optical path of light incident on the first region R1 of the daylighting film 73 and an optical path of light incident on the second region R2.

Example 2

Figure 30:
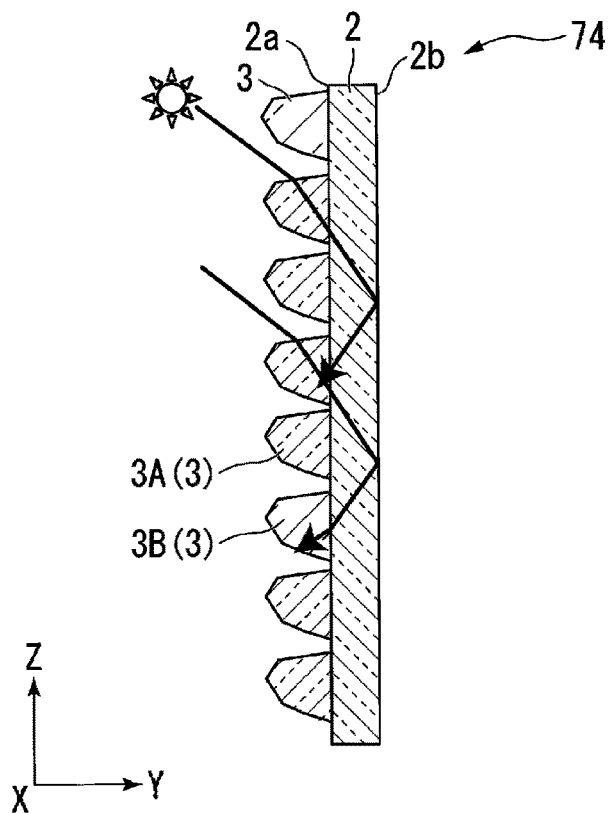
FIG. 30 illustrates a configuration of a daylighting film of Example 2.

FIG. 30 illustrates a configuration of a daylighting film of Example 2.

In a daylighting film 74 illustrated in FIG. 30, a daylighting portion 3B which is one of the daylighting portions 3 is made of a material whose refractive index is different from those of the other daylighting portion 3A and the first base 2. Thereby, an optical path of light transmitted through only the daylighting portion 3A and the first base 2 that are made of the material with the refractive index n1 and an optical path of light transmitted through not only the daylighting portion 3A and the first base 2 that are made of the material with the refractive index n1 but also the daylighting portion 3B made of the material with the refractive index n2 are able to be changed.

Example 3

Figure 31:
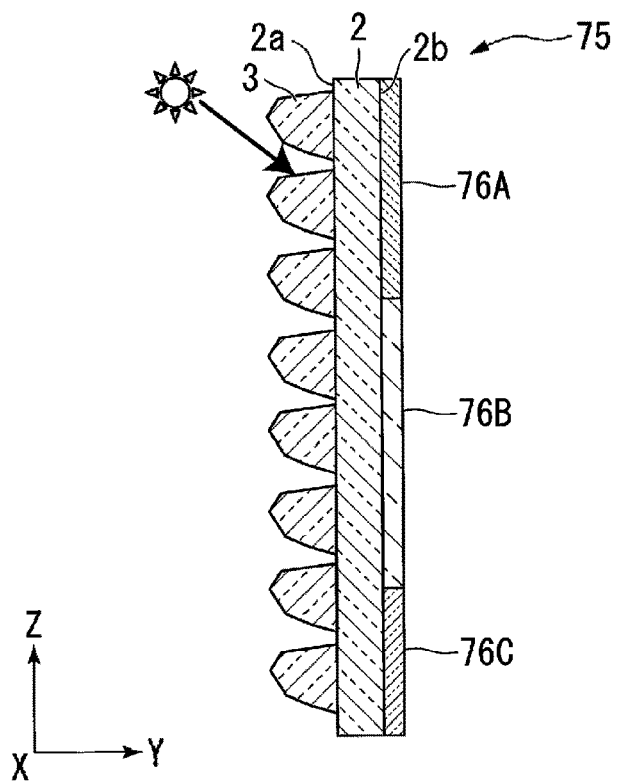
FIG. 31 illustrates a configuration of a daylighting film of Example 3.

FIG. 31 illustrates a configuration of a daylighting film of Example 3.

A daylighting film 75 illustrated in FIG. 31 is configured in such a manner that plate members 76A, 76B, and 76C that have different refractive indexes are provided on the second surface 2b side of the first base 2. Since the plate members 76A, 76B, and 76C may be attached to the daylighting film 75, a change in an optical path is easily adjusted and the daylighting film 75 is easily manufactured.

As described above, according to the daylighting film 75 in the present embodiment, the interval s between the daylighting portions 3 is set to various values and a refractive index is partially differentiated in the daylighting film 75, so that a light flux of a peak of stray light glare is able to be further reduced.

While preferred embodiments according to the invention have been described above with reference to the accompanying drawings, needless to say, the invention is not limited to such examples. It is apparent that a person skilled in the art could conceive of various modifications and alterations within the range of the technical ideas that are described in claims, and of course, such modifications and alterations are understood as falling within the technical scope of the invention.

Eighth Embodiment (Rolling Screen)

Next, a rolling screen (daylighting device) 301 illustrated in FIGS. 32 and 33 will be described as an eighth embodiment of the invention, for example.

Figure 32:
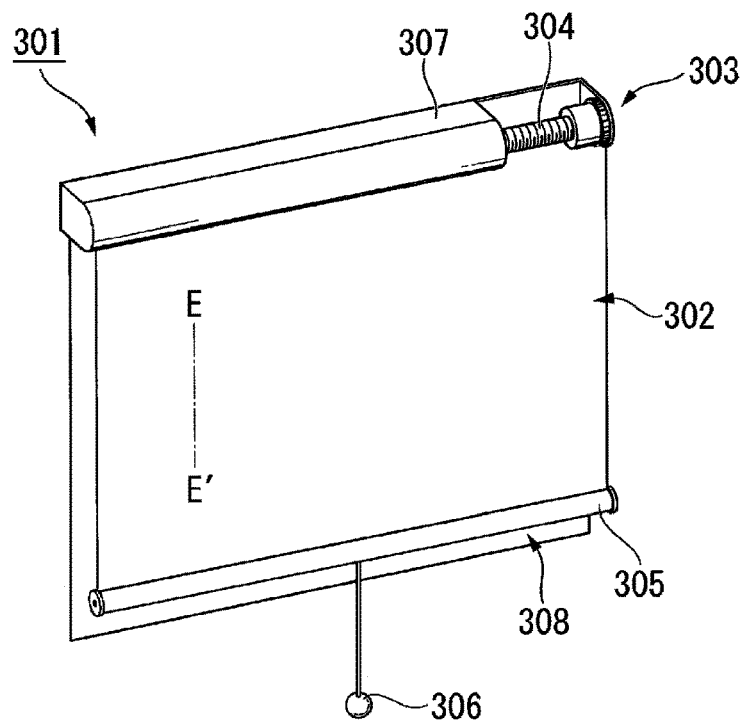
FIG. 32 is a perspective view illustrating a schematic configuration of a rolling screen.

Note that, FIG. 32 is a perspective view illustrating a schematic configuration of the rolling screen 301. FIG. 33 is a sectional view taken along a line E-E' of the rolling screen 301 illustrated in FIG. 32. In the following description, the description of parts equivalent to those of the daylighting film 1 described above will be omitted and the same reference signs are given in the drawings.

Figure 33:
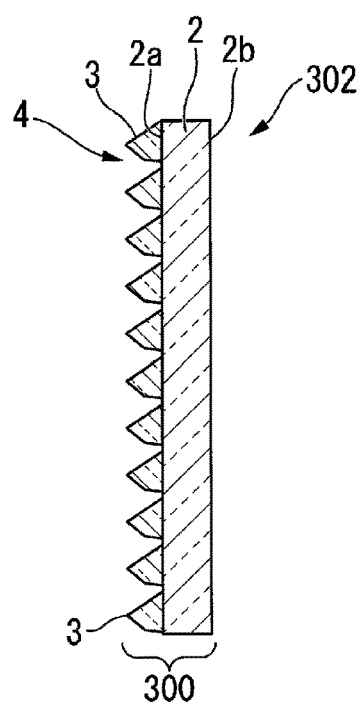
FIG. 33 is a sectional view taken along a line E-E' of the rolling screen illustrated in FIG. 32.

As illustrated in FIGS. 32 and 33, the rolling screen 301 includes a daylighting screen 302 and a winding mechanism 303 which supports the daylighting screen 302 to be wound up as desired.

As illustrated in FIG. 33, the daylighting screen 302 includes a daylighting member 300 including the first base 2 that has optical transparency and has a film shape (sheet shape), the daylighting portions 3 formed to be arrayed on the first surface 2a of the first base 2, and the gaps 4 each of which is formed between the daylighting portions 3, and takes external light through the daylighting member 300. The daylighting screen 302 basically has the same structure as that of the daylighting film 1 described above. However, a thickness of the first base 2 is a thickness suitable for the rolling screen 301.

As illustrated in FIG. 32, the winding mechanism 303 includes a core (support member) 304 attached along an upper end part of the daylighting screen 302, a bottom tube (support member) 305 attached along a lower end part of the daylighting screen 302, a pulling cord 306 attached to the center of the lower end part of the daylighting screen 302, and an accommodation case 307 which accommodates the daylighting screen 302 wound around the core 304.

As a pull-cord type, the winding mechanism 303 is able to fix the daylighting screen 302 at a pulled position, or automatically wind the daylighting screen 302 around the core 304 by further pulling the pulling cord 306 from the pulled position and thereby releasing the fixation. Note that, the winding mechanism 303 is not limited to such a pull-cord type, and may be, for example, a winding mechanism of a chain type that rotates the core 304 with a chain or an automatic winding mechanism that rotates the core 304 with a motor.

The rolling screen 301 having such a configuration is used in a state where the rolling screen 301 opposes the inner surface of the window glass 308 while pulling out the daylighting screen 302 accommodated in the accommodation case 307 by the pulling cord 306, in a state where the accommodation case 307 is fixed above the window glass 308. At this time, the daylighting screen 302 is arranged in a direction in which a direction of the daylighting portions 3 being arranged with respect to the window glass 308 coincides with a top-bottom direction (vertical direction) of the window glass 308. That is, the daylighting screen 302 is arranged so that the longitudinal direction of the daylighting portions 3 with respect to the window glass 308 coincides with a transverse direction (horizontal direction) of the window glass 308.

The daylighting screen 302 opposing the inner surface of the window glass 308 directs the light, which has entered the room through the window glass 308, toward the ceiling in the room, while changing a travelling direction of the light with the daylighting portions 3. The light travelling to the ceiling is reflected by the ceiling and illuminates the inside of the room, and thus the light is used instead of illumination light. Accordingly, in a case where such a rolling screen 301 is used, it is possible to expect an energy saving effect of saving the energy consumed by lighting equipment in a building during the daytime.

As described above, in a case where the rolling screen 301 of the present embodiment is used, it is possible to efficiently bring outdoor natural light (sunlight) into the room, cause a person in the room to feel that the deep inside of the room is bright, without being dazzled, and suppress fluctuation of an illumination position due to the change in the altitude of the sun.

Although not illustrated, as the rolling screen according to the embodiment of the invention, in addition to the configuration of the rolling screen 301 described above, a functional film such as a light diffusion film for diffusing light in a direction facing the glare region G or a heat insulation film having optical transparency for obstructing radiant heat of natural light (sunlight) may be disposed on the second surface 2*b* side of the first base 2, for example.

Ninth Embodiment (Blind)

Next, a blind (daylighting device) 401 illustrated in FIG. 34 will be described as a ninth embodiment of the invention, for example.

Figure 34:
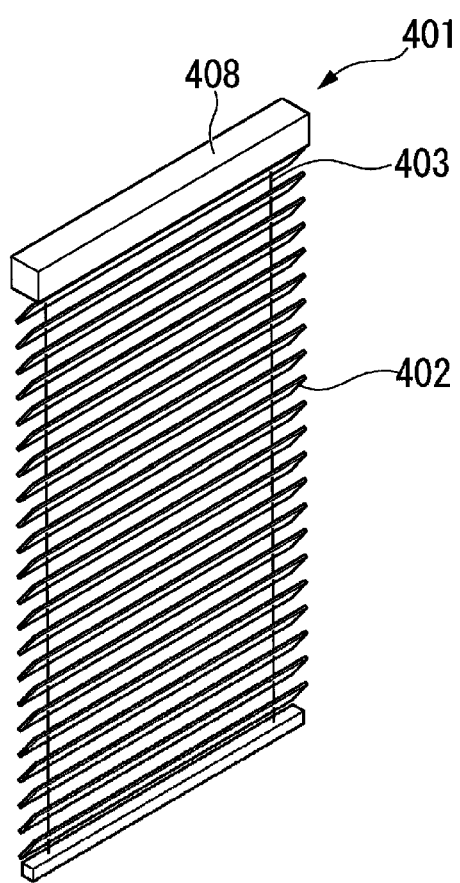
FIG. 34 is a perspective view illustrating a schematic configuration of a blind.
Figure 35A:
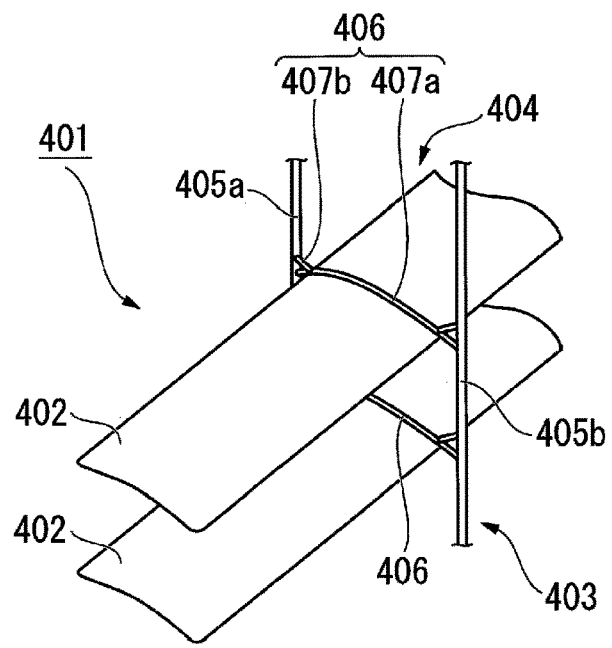
FIG. 35A is a first perspective view illustrating a schematic configuration of the blind.
Figure 35B:
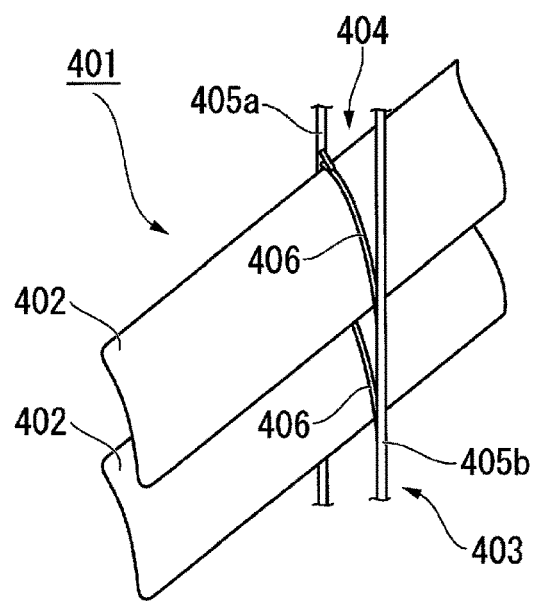
FIG. 35B is a second perspective view illustrating a schematic configuration of the blind.

FIG. 34 is a perspective view illustrating a schematic configuration of a blind. FIGS. 35A and 35B are perspective views each illustrating a schematic configuration of the blind 401. FIG. 35A illustrates an opened state of the blind 401 and FIG. 35B illustrates a closed state of the blind 401. FIGS. 35A and 35B each illustrate a schematic configuration of daylighting slats 402.

In the following description, the description of similar parts to those of the daylighting film 1 described above will be omitted and the same reference signs are given in the drawings.

As illustrated in FIG. 34, the blind 401 includes the daylighting slats 402 arranged side by side with a predetermined interval, a tilting mechanism (support mechanism) 403 that supports the daylighting slats 402 to be tilted as desired, and an accommodation mechanism 408 that folds and accommodates the daylighting slats 402 linked with the tilting mechanism (support mechanism) 403 so as to be able to be accommodated or exposed.

Figure 36:
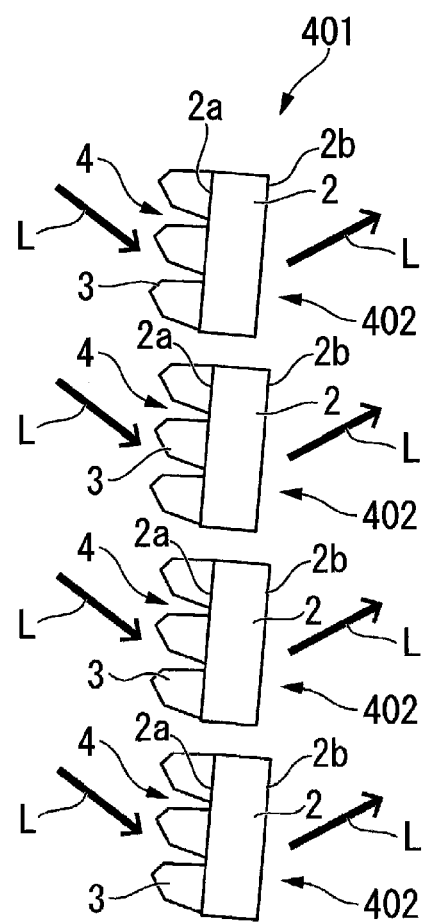
FIG. 36 is a sectional view illustrating a schematic configuration of daylighting slats included in the blind.

As illustrated in FIGS. 35A, 35B, and 36, each of the daylighting slats 402 is a daylighting member including the first base 2 that has optical transparency and has an elongated plate shape, the daylighting portions 3 formed side by side on the first surface 2*a* of the first base 2, and the gaps 4 each of which is formed between the daylighting portions 3. Each of the daylighting slats 402 basically has the same structure as that of the daylighting film 1 described above.

However, the shape of the first base 2 is different from that of the daylighting film or the daylighting screen of each of the embodiments described above.

The tilting mechanism 403 includes two or more ladder cords 404. Although not illustrated, the ladder cords 404 are arrayed in a longitudinal direction of the daylighting slats 402 to thereby support the daylighting slats 402. Specifically, the ladder cords 404 include a pair of vertical cords 405*a* and 405*b* arrayed in parallel to each other, and horizontal cords 406 each of which is stretched between the vertical cords 405*a* and 405*b* and which are arrayed with an equivalent interval in the longitudinal direction of the vertical cords 405*a* and 405*b*. In the ladder cord 404, the daylighting slat 402 is held between the vertical cords 405*a* and 405*b* while the daylighting slat 402 is interposed with a pair of holding cords 407*a* and 407*b* constituting the horizontal cord 406.

Although not illustrated, the tilting mechanism 403 includes an operation mechanism that performs an operation of moving the pair of vertical cords 405*a* and 405*b* in a vertical direction to be reverse to each other. In the tilting mechanism 403, it is possible to tilt the daylighting slats 402 while synchronizing the daylighting slats 402 with each other, with the movement operation of the pair of vertical cords 405*a* and 405*b* performed by the operation mechanism.

The blind 401 having the configuration as described above is used in a state of being suspended from an upper part of a window glass (not illustrated) and opposing an inner surface of the window glass. At that time, each of the daylighting slats 402 is arranged in a direction in which the direction of the daylighting portions 3 being arranged with respect to the window glass coincides with the top-bottom direction (vertical direction) of the window glass. In other words, the daylighting slat 402 is arranged so that a direction of the daylighting portions 3 extending with respect to the window glass coincides with a transverse direction (horizontal direction) of the window glass.

As illustrated in FIG. 36, the blind 401 opposing the inner surface of the window glass directs the light L, which has entered the room through the window glass, toward the ceiling in the room, while changing a travelling direction of the light with the daylighting portions 3. The light L travelling to the ceiling is reflected by the ceiling and illuminates the inside of the room, and thus the light is used instead of illumination light. Accordingly, in a case where such a blind 401 is used, it is possible to expect an energy saving effect of saving the energy consumed by lighting equipment in a building during the daytime.

In the blind 401, it is possible to adjust an angle of the light L travelling to the ceiling by tilting the daylighting slats 402. In addition, it is possible to adjust the light incident from between the daylighting slats 402.

Figure 37:
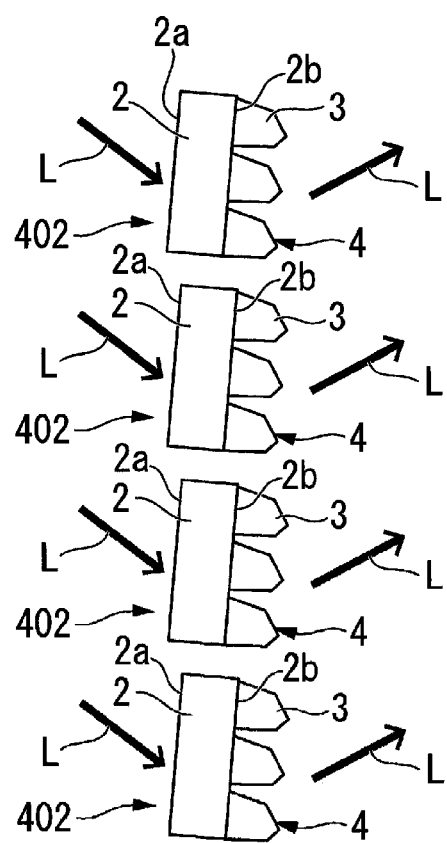
FIG. 37 is a sectional view illustrating a state where directions of the daylighting slats included in the blind are reversed.

As illustrated in FIG. 37, in the blind 401, even in a case where the direction of the daylighting slats 402 is inverted by 180°, it is possible to direct the light L, which has entered the room through the window glass, toward the ceiling in the room, while changing a travelling direction of the light with the daylighting portions 3, in a similar manner to the case before inverting the direction of the daylighting slats 402.

Figure 38:
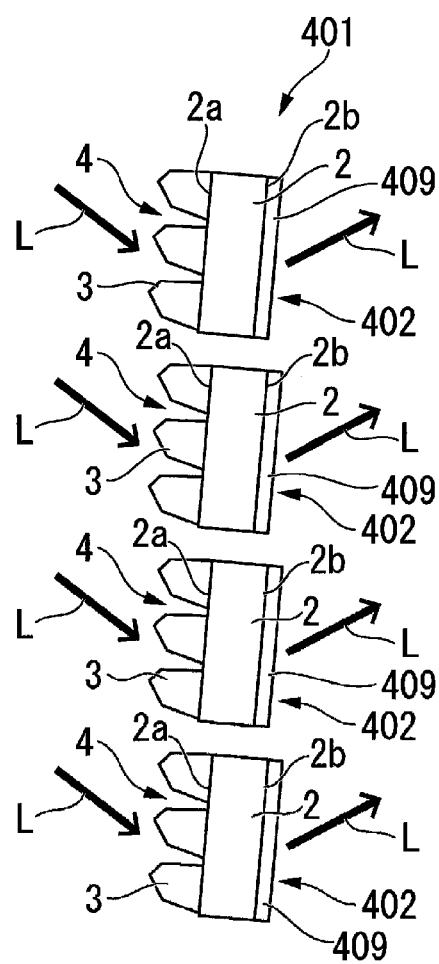
FIG. 38 is a sectional view illustrating a modified example of the daylighting slats.

As illustrated in FIG. 38, a slat member 409 having an elongated plate shape may be separately provided on the second surface 2*b* side of the first base 2 having an elongated plate shape. In this case, it is desirable that refractive indexes of the first base 2 and the slat member 409 are substantially equal to each other.

As described above, in a case where the blind 401 of the present embodiment is used, it is possible to efficiently bring outdoor natural light (sunlight) into the room, cause a person in the room to feel that the deep inside of the room is bright, without being dazzled, and suppress fluctuation of an illumination position due to the change in the altitude of the sun.

Note that, the invention is not necessarily limited to the configuration of the blind 401 of the ninth embodiment and various modifications may be added within a range not departing from the gist of the invention.

For example, although not illustrated, as the blind according to the embodiment of the invention, in addition to the configuration of the blind 401 described above, a functional film (functional member) such as a light diffusion film (light diffusion member) for diffusing light in a direction facing the glare region G or a heat insulation film (heat insulation member) having optical transparency for obstructing radiant heat of natural light (sunlight) may be disposed on the second surface 2b side of the first base 2, for example.

Moreover, as the blind according to the embodiment of the invention, a combination of the daylighting slat 402 described above and a light shielding slat having a light shielding property may be used. In this case, the blind is configured to include a daylighting portion constituted by the daylighting slats 402, and a light shielding portion which is positioned on a lower part of the daylighting portion and constituted by light shielding slats. With such a configuration, it is possible to direct the light, which has entered the room through the window glass, toward the ceiling in the room by using the daylighting slats 402 constituting the daylighting portion and obstruct light travelling to the glare region by using the light shielding slats constituting the light shielding portion.

[Lighting Control System]

Figure 39:
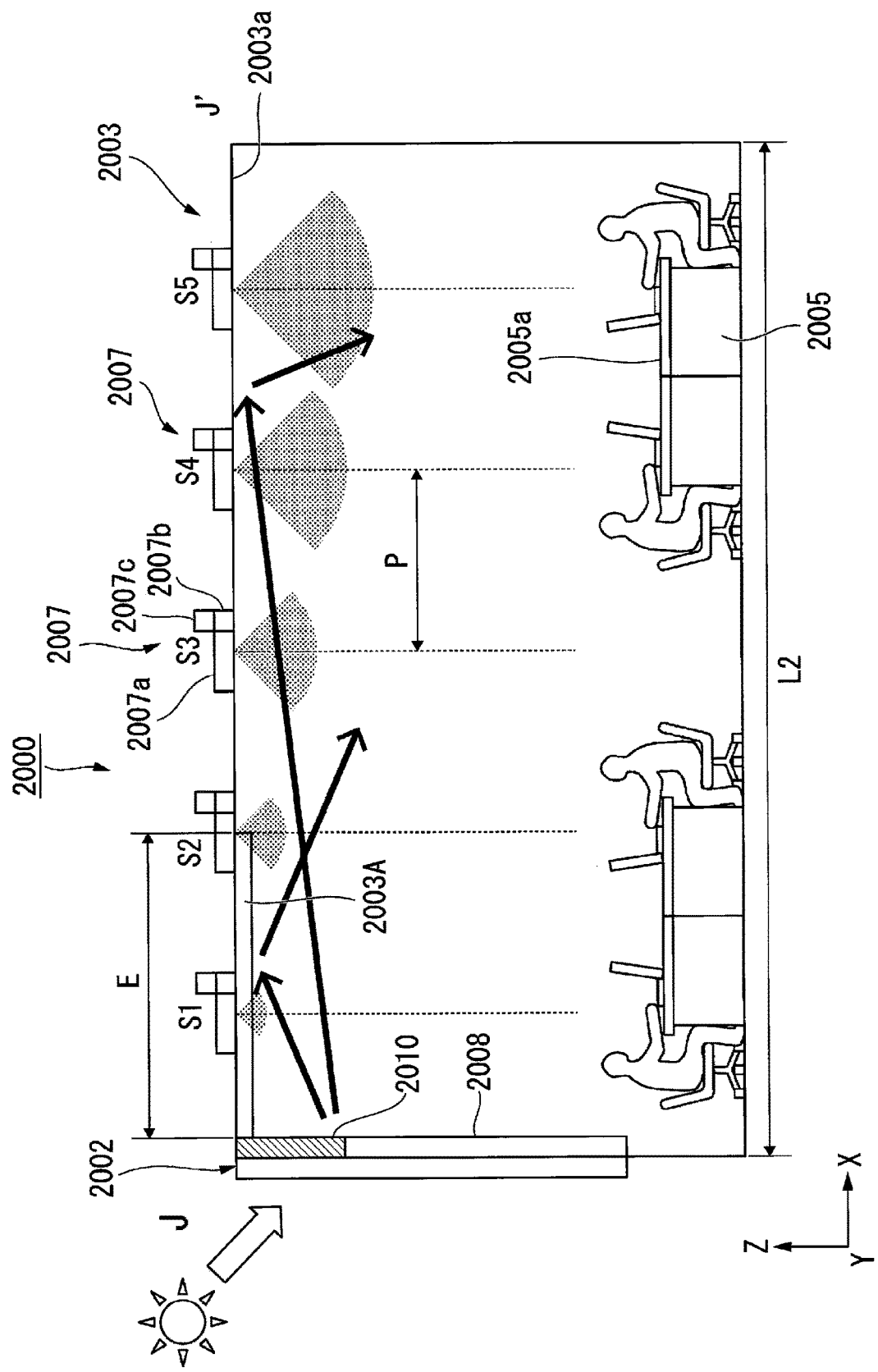
FIG. 39 illustrates a room model including a daylighting device and a lighting control system and is a sectional view taken along a line J-Y of FIG. 40.
Figure 40:
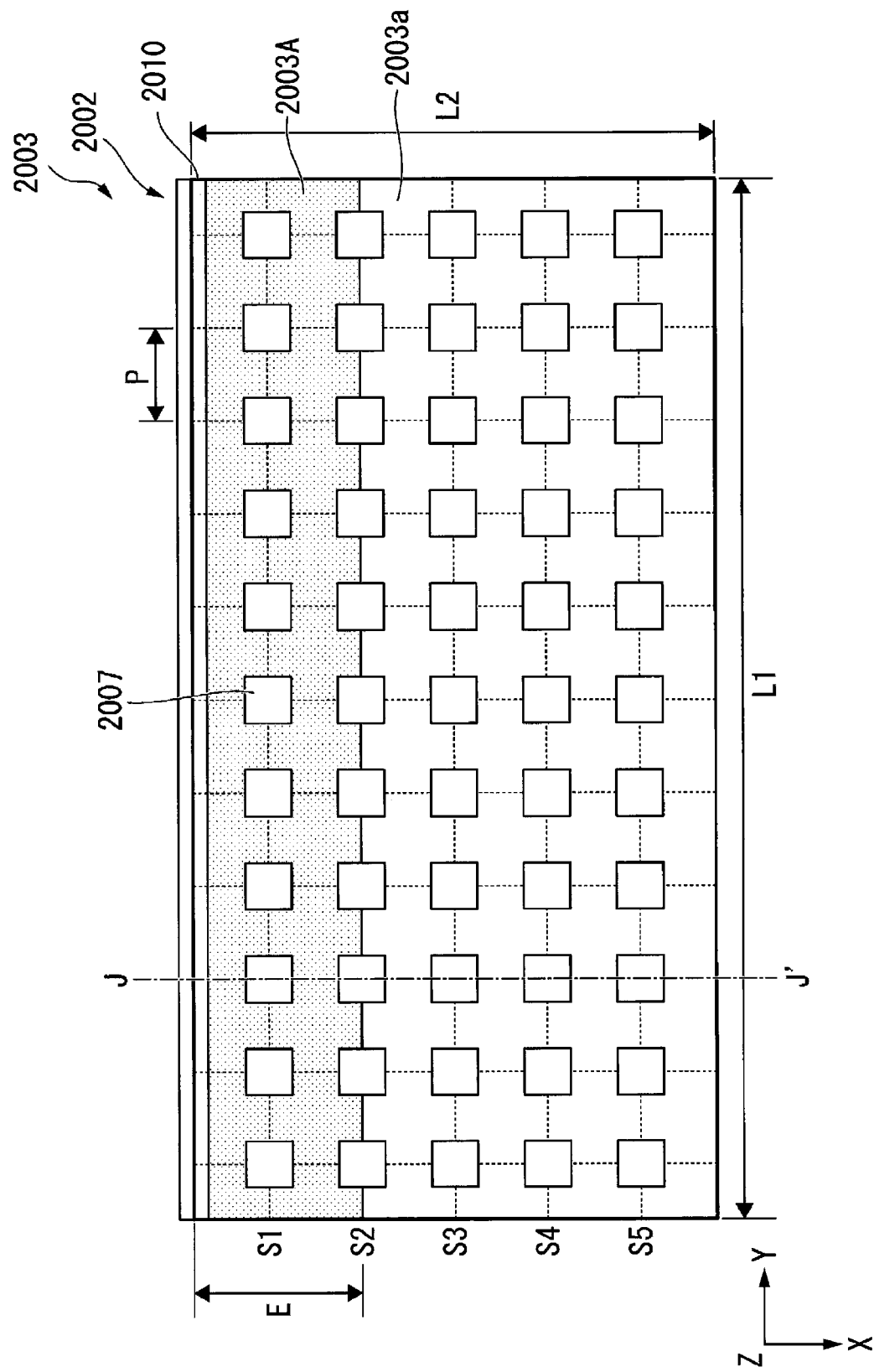
FIG. 40 is a plan view illustrating a ceiling of the room model.

FIG. 39 illustrates a room model 2000 including a daylighting device and a lighting control system and is a sectional view taken along a line J-J' of FIG. 40. FIG. 40 is a plan view illustrating a ceiling of the room model 2000.

In the room model 2000, a ceiling material constituting a ceiling 2003a of a room 2003 to which external light is guided may have high light reflectivity. As illustrated in FIGS. 39 and 40, a light-reflective ceiling material 2003A is installed as a ceiling material having light reflectivity on the ceiling 2003a of the room 2003. The light-reflective ceiling material 2003A is used for the purpose of promoting the guiding of external light from a daylighting device 2010 installed on a window 2002 into the deep inside of the room, and therefore installed on the ceiling 2003a on a window side. Specifically, the light-reflective ceiling material 2003A is installed in a predetermined region E (a region within about 3 m from the window 2002) of the ceiling 2003a.

As described above, the light-reflective ceiling material 2003A functions to efficiently guide, to the deep inside of the room, external light which is guided into the room through the window 2002 on which the daylighting device 2010 (the daylighting device of any embodiment described above) is installed. The external light guided to the ceiling 2003a in the room from the daylighting device 2010 is reflected by the light-reflective ceiling material 2003A and a direction of the light is changed to illuminate a desk top surface 2005a of a desk 2005 which is placed in the deep inside of the room, so that an effect of making the desk top surface 2005a bright is exhibited.

The light-reflective ceiling material 2003A may have diffusion reflectivity or may have specular reflectivity, but preferably has both properties mixed appropriately in order to achieve both the effect of making the desk top surface 2005a of the desk 2005 placed in the deep inside of the room bright and the effect of suppressing glare light uncomfortable for the person in the room.

Though most of the light guided into the room by the daylighting device 2010 travels to the ceiling near the window 2002, a quantity of light is sufficient near the window 2002 in many cases. Thus, the light-reflective ceiling material 2003A as described above is used in combination, and thereby it is possible to allocate the light incident on the ceiling (region E) near the window to the deep inside of the room where an amount of light is less than that near the window side.

The light-reflective ceiling material 2003A is able to be created, for example, by embossing a metal plate made of aluminum or the like with unevenness of about several tens of microns or by applying vapor deposition of a metal thin film made of aluminum or the like to a surface of a resin base on which similar unevenness is formed. Alternatively, unevenness may be formed by embossing a curved surface with longer intervals.

Further, by appropriately changing an embossing shape to be formed on the light-reflective ceiling material 2003A, it is possible to control light distribution characteristics of light and distribution of light in the room. For example, when the embossment is performed in a stripe shape extending to the deep inside of the room, the light reflected by the light-reflective ceiling material 2003A expands in a right-and-left direction (a direction intersecting a longitudinal direction of unevenness) of the window 2002. When a size and a direction of the window 2002 of the room 2003 are limited, by using such a property, it is possible to diffuse the light in a horizontal direction and reflect the light toward the deep inside of the room by the light-reflective ceiling material 2003A.

The daylighting device 2010 is used as a part of a lighting control system of the room 2003. The lighting control system is constituted by components of the entire room, for example, including the daylighting device 2010, indoor lighting devices 2007, a solar radiation adjustment device 2008 installed on the window, a control system for those components, and the light-reflective ceiling material 2003A installed on the ceiling 2003a.

The window 2002 of the room 2003 has the daylighting device 2010 installed on an upper side thereof and has the solar radiation adjustment device 2008 installed on a lower side thereof. Here, a blind is installed as the solar radiation adjustment device 2008, but there is no limitation thereto.

In the room 2003, the indoor lighting devices 2007 are arranged in a lattice manner in the right-and-left direction (Y direction) of the window 2002 and in a depth direction (X direction) of the room. The indoor lighting devices 2007 constitute the entire lighting system of the room 2003 along with the daylighting device 2010.

As illustrated in FIGS. 39 and 40, for example, the ceiling 2003a of an office in which a length L1 of the window 2002 in the right-and-left direction (Y direction) is 18 m and a length L2 of the room 2003 in the depth direction (X direction) is 9 m is illustrated. Here, the indoor lighting devices 2007 are arranged in a lattice manner with each interval P of 1.8 m in a transverse direction (Y direction) and a depth direction (X direction) of the ceiling 2003a.

More specifically, fifty indoor lighting devices 2007 are arrayed with 10 rows (Y direction)×5 columns (X direction).

Each of the indoor lighting devices 2007 includes indoor lighting equipment 2007a, a brightness detection unit 2007b, and a control unit 2007c, and is formed with the brightness detection unit 2007b and the control unit 2007c integrated with the indoor lighting equipment 2007a.

The indoor lighting devices 2007 may include pieces of indoor lighting equipment 2007a and brightness detection units 2007*b*. However, one brightness detection unit 2007*b* is provided for each piece of indoor lighting equipment 2007*a*. The brightness detection unit 2007*b* receives light reflected by a surface to be illuminated by the indoor lighting equipment 2007*a* and detects illuminance of the illuminated surface. Here, the illuminance on the desk top surface 2005*a* of the desk 2005 placed in the room is detected by the brightness detection unit 2007*b*.

The control units 2007*c* each of which is provided in each of the indoor lighting devices 2007 are connected to each other. Each of the indoor lighting devices 2007 performs feedback control, by the control units 2007*c* connected to each other, to adjust a light output of an LED lamp of each indoor lighting equipment 2007*a* so that the illuminance on the desk top surface 2005*a* that is detected by each brightness detection unit 2007*b* is a certain target illuminance L0 (for example, average illuminance: 750 lx).

Figure 41:
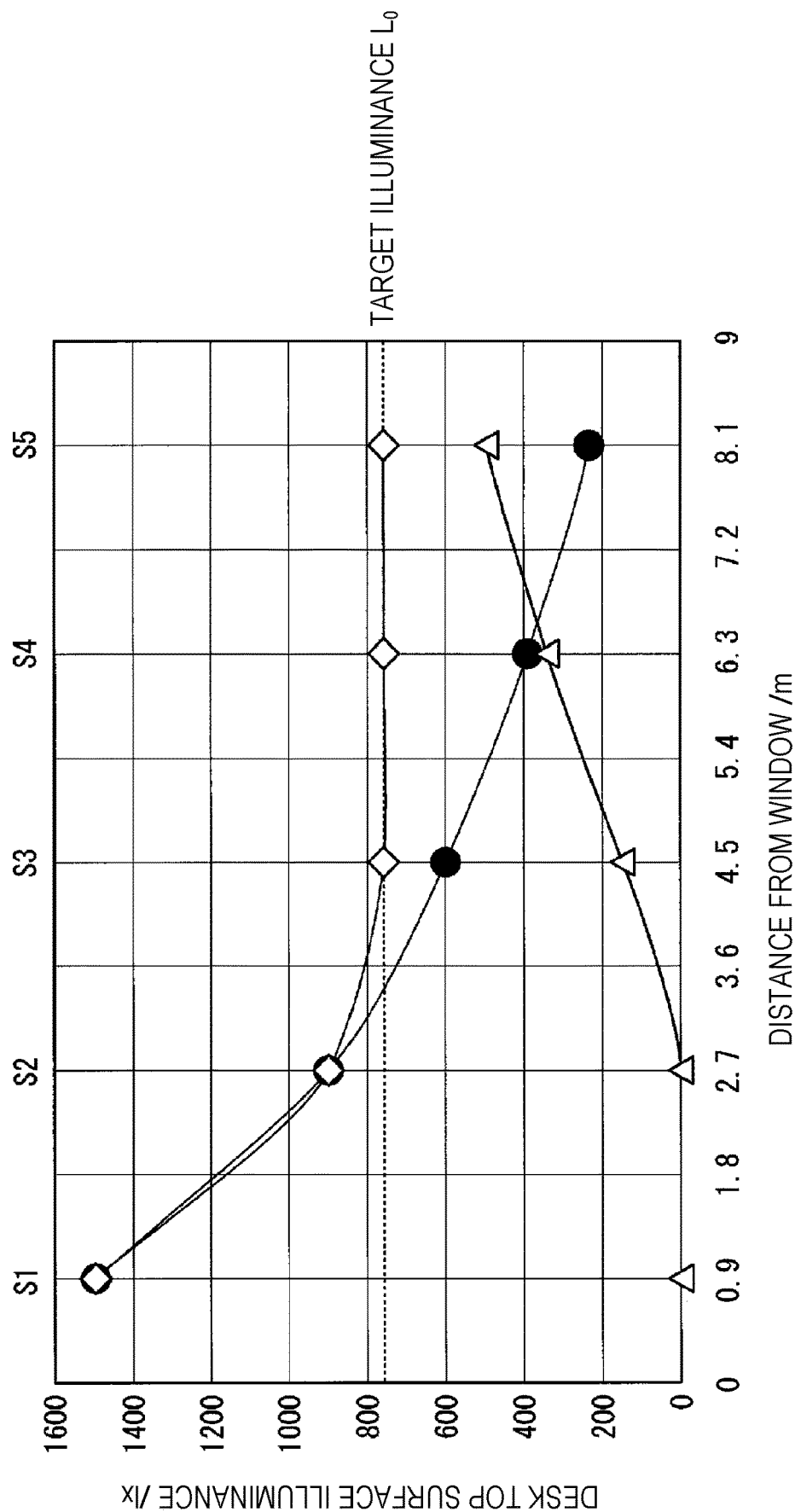
FIG. 41 is a graph illustrating a relationship between illuminance of light (natural light) that is brought into a room by the daylighting device and illuminance (lighting control system) that is provided by indoor lighting devices.

FIG. 41 is a graph illustrating a relationship between illuminance of light (natural light) that is guided into the room by the daylighting device and illuminance (lighting control system) that is provided by the indoor lighting devices. In FIG. 41, a vertical axis indicates illuminance (lx) on the desk top surface and a horizontal axis indicates a distance (m) from the window. Furthermore, a dashed line in the figure indicates indoor target illuminance. (●: illuminance provided by the daylighting device, Δ: illuminance provided by the indoor lighting devices, and ♦: total illuminance)

As illustrated in FIG. 41, the closer the desk is to the window, the more the illuminance on the desk top surface that results from the light that is taken by the daylighting device 2010 increases, and the farther the desk is from the window, the more an effect thereof decreases. In the room to which the daylighting device 2010 is applied, such distribution of illuminance in a deep inside direction of the room occurs with natural daylighting from the window in the daytime. Then, the daylighting device 2010 is used together with the indoor lighting devices 2007 that compensate for the distribution of illuminance in the room. The indoor lighting devices 2007 installed on the ceiling inside the room lights under such lighting control that average illuminances below the devices are detected by the brightness detection units 2007*b*, and the desk top surface illuminance of the entire room becomes certain target illuminance L0.

Thus, columns S1 and S2 installed in the vicinity of the window may not light, and columns S3, S4, and S5 light with higher outputs toward the deep inside direction of the room. As a result, the desk top surface of the room is illuminated by a total of the illuminance attributed to natural lighting and the illuminance attributed to the indoor lighting devices 2007, so that desk top surface illuminance of 750 lx (recommended maintenance illuminance in an office, "JIS Z9110 General rules of recommended lighting levels"), which is considered to be sufficient for work across the entire room, is able to be achieved.

As described above, by using the daylighting device 2010 and the lighting control system (indoor lighting devices 2007) together, it is possible to deliver the light to the deep inside of the room, thus making it possible to further increase the brightness of the inside of the room and ensure desk top surface illuminance considered to be sufficient for work across the entire room. Accordingly, it is possible to obtain a more stable bright light environment regardless of seasons or weathers.

While preferred embodiments according to the invention have been described above with reference to the accompanying drawings, needless to say, the invention is not limited to such examples. It is apparent that a person skilled in the art could conceive of various modifications and alterations within the range of the technical ideas that are described in claims, and of course, such modifications and alterations are understood as falling within the technical scope of the invention.

INDUSTRIAL APPLICABILITY

An aspect of the invention is applicable to, for example, a daylighting device that needs to ensure a good indoor environment where glare is further suppressed and a person in a room is not dazzled, a molding die for molding the daylighting device, and a method of manufacturing a daylighting film.

REFERENCE SIGNS LIST

1 daylighting film, 2, 902 first base (base), 2*a* first surface, 2*b* second surface, 3, 3A, 3B daylighting portion, 3*d*, 3*e* surface (reflective surface), 12*a*, 121*a* one surface, 100 daylighting device, s interval between adjacent daylighting portions, u interval between adjacent first recessed portions, W width of daylighting portion, 300 daylighting member, 301 rolling screen (daylighting device), 303 winding mechanism, 304 core (support member), 305 bottom tube (support member), 401 blind (daylighting device), 408 accommodation mechanism, 2007 indoor lighting device, 2010 daylighting device

The invention claimed is:
1. A daylighting device comprising
at least a daylighting film that includes a base having optical transparency and a plurality of daylighting portions having optical transparency and provided on a first surface of the base, wherein
each of the daylighting portions has a reflective surface by which light incident on the daylighting portion is reflected and the light reflected by the reflective surface and output from a second surface of the base has a characteristic that the light travels toward a space on a side where the light is incident on the reflective surface, the space being one of two spaces divided by a virtual plane as a boundary which is vertical to the second surface of the base and parallel to a direction of the daylighting portion extending,
intervals s between adjacent daylighting portions are set to a plurality of values,
at least a set of the intervals s between the plurality of daylighting portions on the base satisfies a following condition

$$\frac{s1 - s2}{W1} \geq 0.015 \quad \text{[Math. 1]}$$

where s1 and s2 are two of the intervals s between the plurality of daylighting portions on the base and s1 represents a value larger than s2.
2. The daylighting device according to claim 1, wherein at least one of the intervals s between the plurality of daylighting portions on the base is smaller than a width W1 of the daylighting portion in a direction intersecting the direction of the daylighting portions extending and satisfies a relation of s<W1.

3. The daylighting device according to claim 1, wherein the base is integrated with a member that changes an optical path.

4. The daylighting device according to claim 1, wherein a refractive index of the base has distribution in a surface.

5. The daylighting device according to claim 1, wherein a refractive index of the plurality of daylighting portions has distribution in one surface of the base.

6. A daylighting device comprising
at least a daylighting film that includes a base having optical transparency and a plurality of daylighting portions having optical transparency and provided on a first surface of the base, wherein
each of the daylighting portions has a reflective surface by which light incident on the daylighting portion is reflected and the light reflected by the reflective surface and output from a second surface of the base has a characteristic that the light travels toward a space on a side where the light is incident on the reflective surface, the space being one of two spaces divided by a virtual plane as a boundary which is vertical to the second surface of the base and parallel to a direction of the daylighting portion extending,
intervals s between adjacent daylighting portions are set to a plurality of values,
a small structure that has optical transparency or light absorbability exists between the plurality of daylighting portions,
each of the daylighting portions has at least one pair of inclined surfaces that are inclined in directions different from each other relative to one surface of the base and that face each other in a direction of the daylighting portions being arranged, and
a shape of the small structure is similar to a shape of a part of the daylighting portion, the part having the at least one pair of inclined surfaces.

7. The daylighting device according to claim 6, wherein the small structure is made of a material identical to a material of the daylighting portions or the base.

8. A molding die for a daylighting film, the daylighting film including a base having optical transparency and a plurality of daylighting portions having optical transparency and provided on a first surface of the base, in which each of the daylighting portions has a reflective surface by which light incident on the daylighting portion is reflected and the light reflected by the reflective surface and output from a second surface of the base has a characteristic that the light travels toward a space on a side where the light is incident on the reflective surface, the space being one of two spaces divided by a virtual plane as a boundary which is vertical to the second surface of the base and parallel to a direction of the daylighting portion extending, and intervals s between adjacent daylighting portions are set to a plurality of values, the molding die comprising:
a main portion made of metal; and
a plurality of first recessed portions provided on a surface of one side of the main portion and corresponding to the plurality of daylighting portions, wherein
intervals u between adjacent first recessed portions are set to a plurality of values corresponding to the plurality of values of the intervals s, and
at least a set of the intervals u between the plurality of first recessed portions in the main portion satisfies a following condition $$\frac{u1 - u2}{W2} \geq 0.015 \qquad [\text{Math. 2}]$$

where u1 and u2 are two of the intervals u with small values among the intervals u between the plurality of first recessed portions in the main portion, and u2 represents a minimum value and u1 represents a value larger than u2.

9. The molding die according to claim 8, wherein at least one of the intervals u between the plurality of first recessed portions in the main portion is smaller than a width W2 of the first recessed portion in a direction intersecting a direction of the first recessed portions extending and satisfies a relation of u<W2.

10. The molding die according to claim 8, wherein a second recessed portion corresponding to a small structure exists between the plurality of first recessed portions.

11. A method of manufacturing a daylighting film using the molding die according to claim 8, the method comprising:
applying resin having optical transparency to one surface of the main portion and filling the first recessed portions with the resin;
curing the resin to form a daylighting film having a daylighting portion made of the resin; and
separating the daylighting film from the molding die.

12. The method of manufacturing a daylighting film according to claim 11, wherein
a second recessed portion exists between the plurality of first recessed portions, and
in the filling the first recessed portions with the resin, the resin having optical transparency is applied to the first recessed portions and the second recessed portion.

* * * * *